United States Patent
Deng et al.

(10) Patent No.: US 11,361,751 B2
(45) Date of Patent: Jun. 14, 2022

(54) SPEECH SYNTHESIS METHOD AND DEVICE

(71) Applicant: HUAWEI TECHNOLOGIES CO., LTD., Guangdong (CN)

(72) Inventors: Liqun Deng, Shenzhen (CN); Jiansheng Wei, Shenzhen (CN); Wenhua Sun, Leuven (BE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/225,376

(22) Filed: Apr. 8, 2021

(65) Prior Publication Data
US 2021/0287657 A1 Sep. 16, 2021

Related U.S. Application Data

(63) Continuation of application No. PCT/CN2019/110303, filed on Oct. 10, 2019.

(30) Foreign Application Priority Data

Oct. 10, 2018 (CN) .......................... 201811179456.3

(51) Int. Cl.
*G10L 25/63* (2013.01)
*G10L 13/10* (2013.01)
(Continued)

(52) U.S. Cl.
CPC ............ *G10L 13/10* (2013.01); *G10L 13/033* (2013.01); *G10L 13/047* (2013.01); *G10L 25/63* (2013.01); *G10L 2013/105* (2013.01)

(58) Field of Classification Search
CPC ......... G10L 25/63; G10L 13/00; G10L 13/10; G10L 21/00; G10L 15/00
See application file for complete search history.

(56) References Cited

U.S. PATENT DOCUMENTS

| 8,886,537 B2 | 11/2014 | Goldberg et al. |
| 2002/0198717 A1* | 12/2002 | Oudeyer ................. G10L 17/26 |
| | | 704/E13.004 |
| 2007/0208569 A1* | 9/2007 | Subramanian ...... G10L 19/0018 |
| | | 704/E19.007 |

(Continued)

FOREIGN PATENT DOCUMENTS

| CN | 1874574 A | 12/2006 |
| CN | 101030368 A | 9/2007 |

(Continued)

OTHER PUBLICATIONS

Xiaolian Zhu, et al., "Controlling Expressivity using Input Codes in Neural Network based TTS", 2018 First Asian Conference on Affective Computing and Intelligent Interaction (ACII Asia), total 6 pages.

(Continued)

*Primary Examiner* — Shreyans A Patel

(57) ABSTRACT

In a speech synthesis method, an emotion intensity feature vector is set for a target synthesis text, an acoustic feature vector corresponding to an emotion intensity is generated based on the emotion intensity feature vector by using an acoustic model, and a speech corresponding to the emotion intensity is synthesized based on the acoustic feature vector. The emotion intensity feature vector is continuously adjustable, and emotion speeches of different intensities can be generated based on values of different emotion intensity feature vectors, so that emotion types of a synthesized speech are more diversified. This application may be applied to a human-computer interaction process in the artificial intelligence (AI) field, to perform intelligent emotion speech synthesis.

15 Claims, 10 Drawing Sheets

(51) Int. Cl.
*G10L 13/00* (2006.01)
*G10L 21/00* (2013.01)
*G10L 15/00* (2013.01)
*G10L 13/033* (2013.01)
*G10L 13/047* (2013.01)

(56) References Cited

U.S. PATENT DOCUMENTS

| | | | | |
|---|---|---|---|---|
| 2010/0299149 | A1* | 11/2010 | Kurzweil | G10L 13/00 704/260 |
| 2011/0288861 | A1* | 11/2011 | Kurzweil | G09B 5/062 704/E15.044 |
| 2013/0218566 | A1* | 8/2013 | Qian | G10L 13/033 704/E11.001 |
| 2014/0025382 | A1 | 1/2014 | Chen et al. | |
| 2014/0088958 | A1* | 3/2014 | Chen | G10L 13/04 704/214 |
| 2014/0114663 | A1* | 4/2014 | Lin | G10L 13/033 704/260 |
| 2014/0343923 | A1* | 11/2014 | Heilman | G06F 40/30 704/9 |
| 2016/0078859 | A1* | 3/2016 | Luan | G10L 13/033 704/260 |
| 2016/0163332 | A1* | 6/2016 | Un | G10L 13/08 704/260 |
| 2017/0052946 | A1* | 2/2017 | Gu | H04L 51/046 |
| 2017/0092258 | A1* | 3/2017 | Edrenkin | G10L 13/08 |
| 2018/0032611 | A1* | 2/2018 | Cameron | G06F 16/685 |
| 2018/0196796 | A1* | 7/2018 | Wu | G06N 5/022 |
| 2018/0206725 | A1* | 7/2018 | Everett | A61B 5/1116 |
| 2018/0277092 | A1 | 9/2018 | Carr et al. | |
| 2021/0287657 | A1* | 9/2021 | Deng | G06F 40/30 |

FOREIGN PATENT DOCUMENTS

| | | |
|---|---|---|
| CN | 101604204 A | 12/2009 |
| CN | 101661569 A | 3/2010 |
| CN | 102385858 A | 3/2012 |
| CN | 103578462 A | 2/2014 |
| CN | 105139848 A | 12/2015 |
| CN | 105355193 A | 2/2016 |
| CN | 106531150 A | 3/2017 |
| CN | 107680582 A | 2/2018 |
| CN | 108597492 A | 9/2018 |
| GB | 201212783 D0 | 8/2012 |
| JP | 2007148039 A | 6/2007 |

OTHER PUBLICATIONS

Younggun Lee et al., "Emotional End-to-End Neural Speech synthesizer", Nov. 28, 2017, total 5 pages.

Yan-You Chen et al., "Generation of Emotion Control Vector using MDS-based Space Transformation for Expressive Speech Synthesis", INTERSPEECH 2016, Sep. 8-12, 2016, San Francisco, USA, total 5 pages.

International Search Report and Written Opinion issued in PCT/CN2019/110303 dated Jan. 14, 2020, 10 pages.

Office Action issued in CN201811179456.3, dated Jan. 26, 2022, 20 pages.

Yuxuan Wang et al., Style Tokens: Unsupervised Style Modeling, Control and Transfer in End-to-End Speech Synthesis, 2018, 11 pages.

Extended European Search Report issued in EP19871229.1, dated Mar. 3, 2022, 11 pages.

* cited by examiner

SPEECH SYNTHESIS METHOD AND DEVICE

CROSS-REFERENCE TO RELATED APPLICATIONS

This application is a continuation of International Application PCT/CN2019/110303, filed on Oct. 10, 2019, which claims priority to Chinese Patent Application 201811179456.3, filed on Oct. 10, 2018. The disclosures of the aforementioned priority applications are hereby incorporated by reference in their entirety.

TECHNICAL FIELD

The present invention relates to the speech processing field, and in particular, to a speech synthesis method and device.

BACKGROUND

Artificial intelligence (Artificial Intelligence, AI) refers to a theory, a method, a technology, or an application system that is to simulate, extend, and expand human intelligence by using a digital computer or a machine controlled by a digital computer, to perceive an environment, obtain knowledge, and achieve an optimal result by using the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, to enable the machines to have perception, inference, and decision-making functions.

With continuous development of artificial intelligence technologies, a natural language human-machine interaction system in which human-machine interaction can be performed by using a natural language becomes increasingly important. In recent years, a speech synthesis technology has made great progress, and machine text-to-speech has been widely applied to devices such as a smart mobile terminal, a smart appliance, and an in-vehicle sound box. Requirements of people for speech synthesis are not only "clear speech", but also "highly realistic and emotional". Quality of a synthesized speech becomes an important factor of measuring competitiveness of a smart speech product.

Although existing speech synthesis technologies can generate a highly realistic and natural emotion speech, for example, using a happy tone to say "It is weekend again, great", using a sad tone to say "I lost my mobile phone yesterday", using a surprise sound to output "Wow, this plant is flowering", and the like. These emotion speech synthesis technologies use a data driven manner. To be specific, if a "happy" speech is to be synthesized, a "happy" corpus is collected, an acoustic model or a concatenated database that represents a "happy" emotion label is constructed, and then the model (or the database) is used to synthesize the "happy" speech.

Compared with the foregoing speech requirements of synthesizing different emotion types, how to synthesize speeches with different emotion intensities is a further requirement for speech synthesis, and is also a current major technical problem in the speech synthesis field. For example, for a "happy" speech, human ears can identify different levels of happy, such as excitement, happy, and pleasure. This kind of emotion intensity expression is a challenge for a computer. Most of the existing emotion speech synthesis technologies use a data driven manner. To be specific, a large amount of speech data of various emotion types is collected, and modeling is performed for each type of emotion by using the data to generate acoustic parameter models corresponding to different emotions, or to establish an emotion speech segment database for each of different emotion types, so that a target emotion speech is synthesized by using a parameter-based synthesis technology or a unit concatenation technology. Alternatively, in the existing emotion speech synthesis technology, an expression method of simple classification is also used to identify an emotion intensity. For example, based on a subjective feeling of a listener, an emotion intensity of a speech segment is marked as a few simple levels such as "light", "medium", and "heavy". Then, modeling is performed for speech data of a small quantity of intensity levels of each of different emotion categories to generate a speech of a corresponding level. Actually, human perception of an emotion intensity is continuous and is difficult to be defined, or in other words, there is no boundary of different emotion intensities. Therefore, a speech synthesized by using a speech synthesis system represented by an existing emotion intensity cannot reflect continuity of an actual emotion speech in the emotion intensity.

SUMMARY

Embodiments of the present invention provide an emotion speech synthesis method and device, so that an emotion intensity can be continuously adjusted. A continuous emotion intensity feature vector set is generated and constructed by extracting an acoustic statistical feature parameter related to an emotion from original emotion speech audio, and each specific emotion intensity is a corresponding parameter value in the parameter set. During synthesis, speeches of corresponding emotion intensities may be synthesized based on different emotion intensity feature vectors. Because the emotion intensity feature vector has continuous adjustability, in the embodiments of the present invention, continuous adjustability of an emotion intensity in a speech synthesis process can be implemented. Therefore, emotion intensities of speech synthesis can be more diversified, and emotion speeches of different emotion intensities can be synthesized based on user requirements.

An embodiment of the present invention provides a speech synthesis method. The method includes: obtaining a text feature parameter of a target text; obtaining an emotion type of the target text; selecting, based on the emotion type, an acoustic model corresponding to the emotion type; determining an emotion intensity feature vector of the target text; inputting the text feature parameter and the emotion intensity feature vector into the acoustic model to obtain a target acoustic feature vector; and synthesizing, based on the target acoustic feature vector, a speech of an emotion intensity corresponding to the target text. The acoustic model is a machine learning model.

According to the foregoing method, acoustic models are classified based on different emotion types. A corresponding acoustic model is selected based on an emotion type. A synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

Optionally, the acoustic model is obtained through training by using a text feature parameter and an emotion intensity feature vector of a training sample corresponding to the emotion type as an input and by using an acoustic feature vector of the training sample as an output.

Optionally, the emotion intensity feature vector is obtained by reducing dimensions of an acoustic statistical feature vector of the training sample.

Optionally, the determining an emotion intensity feature vector of the target text specifically includes: receiving an emotion intensity value input by a user, to determine a corresponding emotion intensity feature vector, where the emotion intensity value input by the user is continuously adjustable.

Optionally, the determining an emotion intensity feature vector of the target text specifically includes: analyzing a target text to determine an emotion intensity feature vector.

According to the foregoing method, an emotion feature parameter is further added in a process of training an acoustic model of a corresponding emotion type. In this way, an acoustic model obtained through training can generate acoustic features of various emotion intensities based on different emotion intensity feature vectors. In addition, dimension reduction processing is performed to enable a dimension of the emotion intensity feature vector to be comparatively low. This reduces complexity of speech synthesis of the emotion intensity, and enhances manipulability of adjusting the emotion intensity in actual application.

Optionally, the text feature parameter includes one or more of text regularization, word segmentation, part-of-speech tagging, syntax analysis, prosodic prediction, grapheme-to-phoneme (G2P) conversion, and duration information.

Optionally, the emotion intensity feature vector is a 3-dimensional feature vector.

According to the foregoing method, dimension reduction processing is performed, to set the emotion intensity feature vector to a 3-dimensional vector, so as to construct emotion intensity feature space. This reduces complexity of speech synthesis of the emotion intensity, and enhances manipulability of adjusting the emotion intensity in actual application.

Optionally, the target acoustic feature vector is one or more of a logarithmic fundamental frequency, a line spectrum pair parameter, and an unvoiced flag.

Optionally, the target acoustic feature vector is one or more of a logarithmic fundamental frequency (1 dimension), a line spectrum pair parameter (41 dimensions), and an unvoiced flag (1 dimension).

Optionally, the acoustic model may be obtained through deep neural network training.

Optionally, that the emotion intensity feature vector of the training sample is obtained by reducing dimensions of an acoustic feature vector statistical value of the training sample includes: obtaining an acoustic feature vector statistical value related to an emotion intensity of the training sample, where the acoustic feature vector statistical value related to the emotion intensity includes: an energy average value, an energy maximum value, an energy change amplitude, a speech rate average value, a logarithmic fundamental frequency average value, a logarithmic fundamental frequency maximum value, and a logarithmic fundamental frequency change amplitude; and there are N training samples, where N>1; and converting the acoustic feature vector statistical value that is related to the emotion intensity and that is of the N training samples into a 3-dimensional emotion intensity feature vector.

An embodiment of the present invention further provides a speech synthesis method. The method includes: obtaining a text feature parameter of a target text; obtaining an emotion type of the target text; determining an emotion intensity feature vector of the target text; inputting the text feature parameter, the emotion type, and the emotion intensity feature vector of the target text into an acoustic model to obtain a target acoustic feature vector; and synthesizing, based on the target acoustic feature vector, a speech of an emotion intensity corresponding to the target text. The acoustic model is a machine learning model.

According to the foregoing method, a synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

Optionally, the acoustic model is obtained through training by using a text feature parameter and an emotion intensity feature vector of a training sample corresponding to the emotion type as an input and by using an acoustic feature vector of the training sample as an output.

Optionally, the emotion intensity feature vector is obtained by reducing dimensions of an acoustic statistical feature vector of the training sample.

Optionally, the determining an emotion intensity feature vector of the target text specifically includes: receiving an emotion intensity value input by a user, to determine a corresponding emotion intensity feature vector, where the emotion intensity value input by the user is continuously adjustable.

Optionally, the determining an emotion intensity feature vector of the target text specifically includes: analyzing a target text to determine an emotion intensity feature vector.

According to the foregoing method, an emotion feature parameter is further added in a process of training an acoustic model of a corresponding emotion type. In this way, an acoustic model obtained through training can generate acoustic features of various emotion intensities based on different emotion intensity feature vectors. In addition, dimension reduction processing is performed to enable a dimension of the emotion intensity feature vector to be comparatively low. This reduces complexity of speech synthesis of the emotion intensity, and enhances manipulability of adjusting the emotion intensity in actual application.

Optionally, the text feature parameter includes one or more of text regularization, word segmentation, part-of-speech tagging, syntax analysis, prosodic prediction, grapheme-to-phoneme (G2P) conversion, and duration information.

Optionally, the emotion intensity feature vector is a 3-dimensional feature vector.

According to the foregoing method, dimension reduction processing is performed, to set the emotion intensity feature vector to a 3-dimensional vector, so as to construct emotion intensity feature space. This reduces complexity of speech synthesis of the emotion intensity, and enhances manipulability of adjusting the emotion intensity in actual application.

Optionally, the target acoustic feature vector is one or more of a logarithmic fundamental frequency, a line spectrum pair parameter, and an unvoiced flag.

Optionally, the target acoustic feature vector is one or more of a logarithmic fundamental frequency (1 dimension), a line spectrum pair parameter (41 dimensions), and an unvoiced flag (1 dimension).

Optionally, the acoustic model may be obtained through deep neural network training.

Optionally, that the emotion intensity feature vector of the training sample is obtained by reducing dimensions of an acoustic feature vector statistical value of the training sample includes: obtaining an acoustic feature vector statistical value related to an emotion intensity of the training sample, where the acoustic statistical feature vector related to the emotion intensity includes: an energy average value, an energy maximum value, an energy change amplitude, a speech rate average value, a logarithmic fundamental frequency average value, a logarithmic fundamental frequency maximum value, and a logarithmic fundamental frequency change amplitude; and there are N training samples, where N>1; and converting the acoustic feature vector statistical value that is related to the emotion intensity and that is of the N training samples into a 3-dimensional emotion intensity feature vector.

An embodiment of the present invention further provides an emotion speech acoustic feature obtaining device. The emotion speech acoustic feature obtaining device includes at least one processor and a memory coupled to the at least one processor, where the memory includes an instruction that may be run by the at least one processor to perform functions; and the functions include: obtaining a text feature parameter of a target text; obtaining an emotion type of the target text; selecting, based on the emotion type, an acoustic model corresponding to the emotion type; receiving an emotion intensity value input by a user, to determine a corresponding emotion intensity feature vector, where the emotion intensity value input by the user is continuously adjustable; or analyzing a target text to determine an emotion intensity feature vector; and inputting the text feature parameter and the emotion intensity feature vector into the acoustic model to obtain a target acoustic feature vector.

Optionally, the acoustic model is obtained through training by using a text feature parameter and an emotion intensity feature vector of a training sample corresponding to the emotion type as an input and by using an acoustic feature vector of the training sample as an output.

Optionally, the emotion intensity feature vector is obtained by reducing dimensions of an acoustic statistical feature vector of the training sample.

Optionally, the acoustic model is a machine learning model.

Optionally, the acoustic model is obtained through training by using a text feature parameter and an emotion intensity feature vector of a training sample corresponding to the emotion type as an input and by using an acoustic feature vector of the training sample as an output.

An embodiment of the present invention further provides an emotion speech acoustic feature obtaining device. The emotion speech acoustic feature obtaining device includes at least one processor and a memory coupled to the at least one processor, where the memory includes an instruction that may be run by the at least one processor to perform functions; and the functions include: obtaining a text feature parameter of a target text; obtaining an emotion type of the target text; receiving an emotion intensity value input by a user, to determine a corresponding emotion intensity feature vector, where the emotion intensity value input by the user is continuously adjustable; or analyzing a target text to determine an emotion intensity feature vector; and inputting the text feature parameter, the emotion type, and the emotion intensity feature vector of the target text into an acoustic model to obtain a target acoustic feature vector.

Optionally, the acoustic model is obtained through training by using an emotion type, a text feature parameter, and an emotion intensity feature vector of a training sample as an input and by using an acoustic feature vector of the training sample as an output.

Optionally, the emotion intensity feature vector is obtained by reducing dimensions of an acoustic statistical feature vector of the training sample.

An embodiment of the present invention further provides a speech synthesis device. The emotion speech acoustic feature obtaining device includes at least one processor, a memory coupled to the at least one processor, and a vocoder, where the memory includes an instruction that may be run by the at least one processor to perform functions; and the functions include: obtaining a text feature parameter of a target text; obtaining an emotion type of the target text; selecting, based on the emotion type, an acoustic model corresponding to the emotion type; receiving an emotion intensity value input by a user, to determine a corresponding emotion intensity feature vector, where the emotion intensity value input by the user is continuously adjustable; or analyzing a target text to determine an emotion intensity feature vector; and inputting the text feature parameter and the emotion intensity feature vector into the acoustic model to obtain a target acoustic feature vector; and the vocoder is configured to synthesize an emotion speech based on the obtained target acoustic feature vector.

According to the foregoing device, acoustic models are classified based on different emotion types. A corresponding acoustic model is selected based on an emotion type. A synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

Optionally, the acoustic model is obtained through training by using a text feature parameter and an emotion intensity feature vector of a training sample corresponding to the emotion type as an input and by using an acoustic feature vector of the training sample as an output.

Optionally, the emotion intensity feature vector is obtained by reducing dimensions of an acoustic statistical feature vector of the training sample.

Optionally, the acoustic model is a machine learning model.

Optionally, the acoustic model is obtained through training by using a text feature parameter and an emotion intensity feature vector of a training sample corresponding to the emotion type as an input and by using an acoustic feature vector of the training sample as an output.

An emotion feature parameter is added in a process of training an acoustic model of a corresponding emotion type. In this way, an acoustic model obtained through training can generate acoustic features of various emotion intensities based on different emotion intensity feature vectors. In addition, dimension reduction processing is performed to enable a dimension of the emotion intensity feature vector to be comparatively low. This reduces complexity of speech synthesis of the emotion intensity, and enhances manipulability of adjusting the emotion intensity in actual application.

An embodiment of the present invention further provides a speech synthesis device. The emotion speech acoustic feature obtaining device includes at least one processor and a memory coupled to the at least one processor, and a vocoder, where the memory includes an instruction that may be run by the at least one processor to perform functions; and the functions include: obtaining a text feature parameter of a target text; obtaining an emotion type of the target text; receiving an emotion intensity value input by a user, to determine a corresponding emotion intensity feature vector, where the emotion intensity value input by the user is continuously adjustable; or analyzing a target text to determine an emotion intensity feature vector; and inputting the text feature parameter, the emotion type, and the emotion intensity feature vector of the target text into an acoustic model to obtain a target acoustic feature vector; and the vocoder is configured to synthesize an emotion speech based on the obtained target acoustic feature vector.

According to the foregoing method, a synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

Optionally, the acoustic model is obtained through training by using an emotion type, a text feature parameter, and an emotion intensity feature vector of a training sample as an input and by using an acoustic feature vector of the training sample as an output.

Optionally, the emotion intensity feature vector is obtained by reducing dimensions of an acoustic statistical feature vector of the training sample.

An emotion feature parameter is added in a process of training an acoustic model. In this way, an acoustic model obtained through training can generate acoustic features of various emotion intensities based on different emotion intensity feature vectors. In addition, dimension reduction processing is performed to enable a dimension of the emotion intensity feature vector to be comparatively low. This reduces complexity of speech synthesis of the emotion intensity, and enhances manipulability of adjusting the emotion intensity in actual application.

An embodiment of the present invention further provides a speech synthesis device. The speech synthesis device includes: a text feature obtaining module, configured to obtain a text feature parameter of a target text; an emotion type setting module, configured to obtain an emotion type of the target text; an emotion intensity setting module, configured to determine an emotion intensity feature vector of the target text; an acoustic model obtaining module, configured to select, based on the emotion type, an acoustic model corresponding to the emotion type, and input the text feature parameter and the emotion intensity feature vector into the acoustic model to obtain a target acoustic feature vector; and a vocoder, configured to synthesize, based on the target acoustic feature vector, a speech of an emotion intensity corresponding to the target text. The acoustic model is a machine learning model.

According to the foregoing device, acoustic models are classified based on different emotion types. A corresponding acoustic model is selected based on an emotion type. A synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

Optionally, that an emotion intensity setting module is configured to determine an emotion intensity feature vector of the target text specifically includes: receiving an emotion intensity value input by a user, to determine a corresponding emotion intensity feature vector, where the emotion intensity value input by the user is continuously adjustable.

Optionally, that an emotion intensity setting module is configured to determine an emotion intensity feature vector of the target text specifically includes: analyzing a target text to determine an emotion intensity feature vector.

Optionally, the acoustic model is obtained through training by using a text feature parameter and an emotion intensity feature vector of a training sample corresponding to the emotion type as an input and by using an acoustic feature vector of the training sample as an output.

Optionally, the emotion intensity feature vector of the training sample is obtained by reducing dimensions of an acoustic feature vector statistical value of the training sample.

An embodiment of the present invention further provides a speech synthesis device. The speech synthesis device includes: a text feature obtaining module, configured to obtain a text feature parameter of a target text; an emotion type setting module, configured to obtain an emotion type of the target text; an emotion intensity setting module, configured to determine an emotion intensity feature vector of the target text; an acoustic model obtaining module, configured to input the text feature parameter, the emotion intensity feature vector, and the emotion type of the target text into an acoustic model to obtain a target acoustic feature vector; and a vocoder, configured to synthesize, based on the target acoustic feature vector, a speech of an emotion intensity corresponding to the target text. The acoustic model is a machine learning model.

According to the foregoing device, acoustic models are classified based on different emotion types. A corresponding acoustic model is selected based on an emotion type. A synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

Optionally, that an emotion intensity setting module is configured to determine an emotion intensity feature vector of the target text specifically includes: receiving an emotion intensity value input by a user, to determine a corresponding emotion intensity feature vector, where the emotion intensity value input by the user is continuously adjustable.

Optionally, that an emotion intensity setting module is configured to determine an emotion intensity feature vector of the target text specifically includes: analyzing a target text to determine an emotion intensity feature vector.

Optionally, the acoustic model is obtained through training by using a text feature parameter and an emotion intensity feature vector of a training sample corresponding to the emotion type as an input and by using an acoustic feature vector of the training sample as an output.

Optionally, the emotion intensity feature vector of the training sample is obtained by reducing dimensions of an acoustic feature vector statistical value of the training sample.

An embodiment of the present invention further provides a speech synthesis system.

The speech synthesis system includes a terminal and a server. The server is configured to perform acoustic model training on one or more emotion types based on one or more emotion type training samples, and send an acoustic model or acoustic models of the one or more emotion types to the terminal.

The terminal is configured to: obtain a text feature parameter of a target text; obtain an emotion type of the target text; select, based on the emotion type, an acoustic model corresponding to the emotion type; determine an emotion intensity feature vector of the target text; input the text feature parameter and the emotion intensity feature vector into the acoustic model to obtain a target acoustic feature vector; and synthesize, based on the target acoustic feature vector, a speech of an emotion intensity corresponding to the target text. The acoustic model is a machine learning model.

According to the foregoing system, acoustic models are classified based on different emotion types. A corresponding acoustic model is selected based on an emotion type. A synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

An embodiment of the present invention further provides a speech synthesis system. The speech synthesis system includes a terminal and a server. The server is configured to perform acoustic model training based on training samples of a plurality of emotion types, and send an acoustic model obtained through training to the terminal.

The terminal is configured to obtain a text feature parameter of a target text; obtain an emotion type of the target text; determine an emotion intensity feature vector of the target text; input the text feature parameter, the emotion type, and the emotion intensity feature vector of the target text into the acoustic model to obtain a target acoustic feature vector; and synthesize, based on the target acoustic feature vector, a speech of an emotion intensity corresponding to the target text. The acoustic model is a machine learning model.

According to the foregoing system, a synthesized speech of a different emotion intensity in a specific emotion type can be conveniently and flexibly generated by setting an emotion intensity feature vector. In this way, an emotion type of the synthesized speech is more delicate and can be changed and adjusted based on a different parameter setting.

An embodiment of the present invention further provides a computer readable storage medium. The computer readable storage medium stores an instruction. When the instruction is run on a computer, the computer is enabled to perform the foregoing speech synthesis method.

An embodiment of this application further provides a computer program product including an instruction. When the computer program product is run on a computer, the computer is enabled to perform the foregoing speech synthesis method.

It can be learned that, by implementing the technical solutions in the embodiments of the present invention, speeches with different emotion intensity effects can be synthesized by setting an emotion intensity feature vector, and an emotion intensity effect of the synthesized speech is continuously adjustable. This can meet diversified requirements of users, and generate speeches with various emotion intensities. In addition, an emotion intensity feature vector generated after dimension reduction is used for acoustic model training, so that adjustment of an emotion intensity of an obtained acoustic model is more convenient and controllable, to improve user interaction experience to a largest degree.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

Figure 1A:
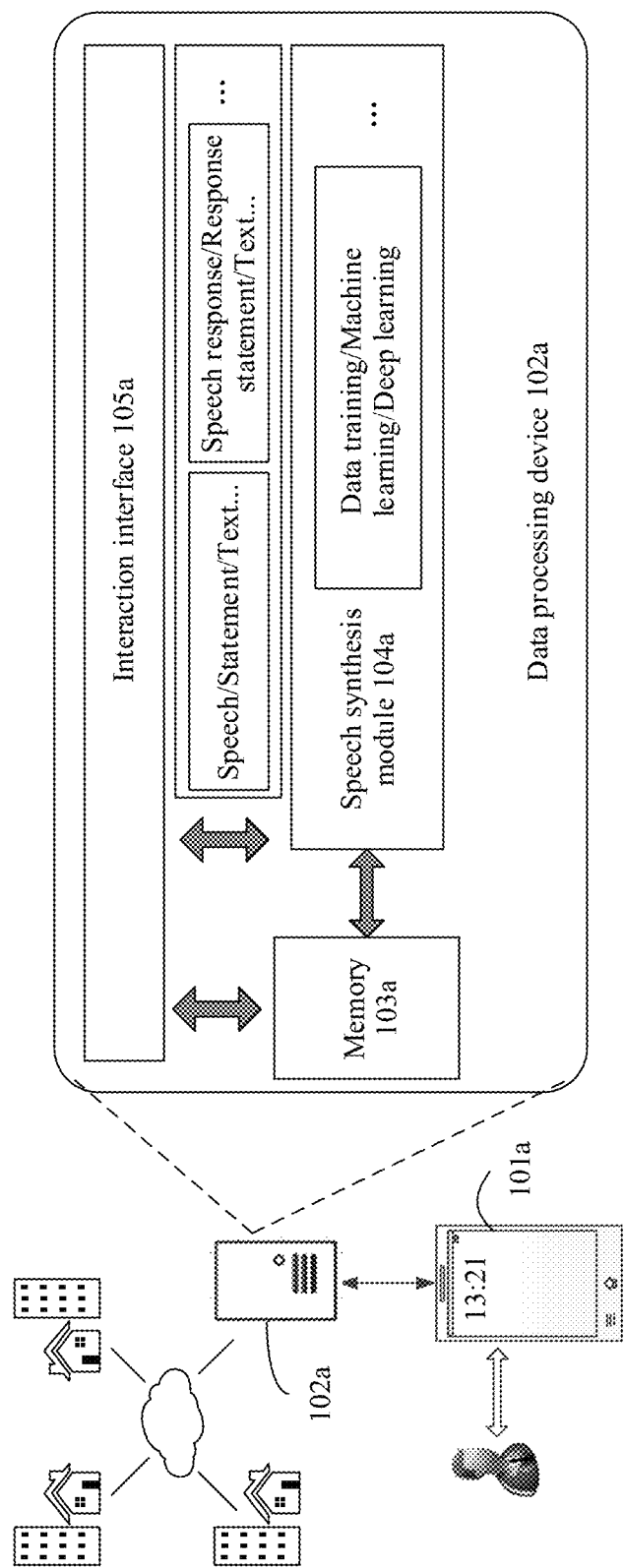
FIG. 1A is a schematic diagram of a natural language processing system according to an embodiment of the present invention.

Although existing speech synthesis technology can generate a highly realistic and natural emotion speech, these emotion speech synthesis technologies use a data driven manner. To be specific, if a "happy" speech is to be synthesized, a "happy" corpus is collected, an acoustic model or a concatenated database that represents a "happy" emotion label is constructed, and then the model (or the database) is used to synthesize the "happy" speech. However, how to synthesize speeches with different emotion intensities is still a current major technical problem in the speech synthesis field. Specific embodiments of the present invention are mainly used to resolve an emotion speech synthesis problem that an emotion intensity is adjustable. In this way, an emotion intensity of a synthesized speech is continuously adjustable, and may be independently adjusted based on a user requirement; or emotion speech synthesis may be performed by selecting a corresponding emotion intensity feature vector through machine analysis.

The following describes specific implementations of the present invention by using examples with reference to the accompanying drawings in the embodiments of the present invention. However, the implementations of the present invention may also include a combination of these embodiments without departing from the spirit or scope of the present invention, for example, using other embodiments and making structural changes. Therefore, the following detailed descriptions of the embodiments should not be understood in a restrictive sense. Terms used in the embodiment part of the present invention are merely intended to describe specific embodiments of the present invention, but are not intended to limit the present invention.

One or more structures of functions, modules, features, units, and the like mentioned in the specific embodiments of the present invention may be understood as being implemented in any manner by any physical or tangible component (for example, software and hardware (for example, a logical function implemented by a processor or a chip) running on a computer device, and/or any combination thereof). In some embodiments, division of various devices into different modules or units shown in the accompanying drawings may reflect use of corresponding different physical and tangible components in actual implementation. Optionally, a single module in the accompanying drawings of the embodiments of the present invention may alternatively be implemented by a plurality of actual physical components. Similarly, any two or more modules described in the accompanying drawings may alternatively reflect different functions performed by a single actual physical component.

In a method flowchart of the embodiments of the present invention, some operations are described as different steps performed in a specific sequence. Such a flowchart is illustrative but not restrictive. Some steps described in this specification may be grouped together and performed in a single operation, some steps may be split into a plurality of sub-steps, and some steps may be performed in a sequence different from that described in this specification. Steps shown in the flowchart may be implemented in any manner by any circuit structure and/or tangible mechanism (for example, software and hardware (for example, a logical function implemented by a processor or a chip) running on a computer device, and/or any combination thereof).

In the following description, one or more features may be marked as "optional". This type of declaration should not be explained as an exhaustive indication of features that may be considered as optional. In other words, although not explicitly marked in this specification, another feature may be considered to be optional. Furthermore, any description of a single entity is not intended to exclude use of a plurality of such entities. Similarly, description of a plurality of entities is not intended to exclude use of a single entity. Finally, the term "example" refers to an implementation in many potential implementations.

To facilitate understanding of the technical solutions in the embodiments of the present invention, related concepts in the embodiments of the present invention are first described.

Speech sound (speech sound): A speech sound, namely, a sound of a speech, is a sound wave form of a speech communications tool.

Statistical parametric speech synthesis (Statistical Parametric Speech Synthesis): A working principle of the statistical parametric speech synthesis is to abstract a text on which speech synthesis needs to be performed into a phonetic feature, and then generate an acoustic feature corresponding to the to-be-synthesized text by using the phonetic feature. Generally, this step may be implemented by learning, by using a statistical model, a correspondence between the phonetic feature and the acoustic feature corresponding to the phonetic feature. Finally, a vocoder is used to restore the acoustic feature to a speech waveform.

Concatenation-based synthesis (Unit Selection based Speech Synthesis): Concatenation-based synthesis is speech synthesis based on waveform concatenation, and is specifically that proper concatenation units are extracted from a corpus to construct a waveform unit library. During synthesis, proper concatenation units are selected from the waveform unit library based on a phonetic feature of a to-be-synthesized text, and are concatenated into a statement.

Fundamental frequency (F0) (Fundamental Frequency): When a vocal body makes a sound due to vibration, the sound may be generally divided into a plurality of simple sine waves. In other words, all natural sounds are basically formed by a plurality of sine waves with different frequencies, a sine wave with a lowest frequency is the fundamental frequency (represented by F0), and other sine waves with a higher frequency is overtones.

Speech rate (speech rate): A speech rate represents a rate of a speech and is measured by a quantity of syllables in a unit time.

Energy (Energy): Energy is also referred to as an intensity or a volume, represents a volume of a sound, and may be simulated by using an amplitude of a sound signal. A larger amplitude indicates a higher volume of a sound waveform.

Convolutional neural network: A convolutional neural network includes one or more convolution layers and a top fully connected layer (corresponding to a classic neural network), and also includes an association weight and a pooling layer (pooling layer). This structure enables the convolutional neural network to use a two-dimensional structure of input data. In comparison with another deep learning structure, the convolutional neural network can provide a better result in speech recognition, and belongs to a common deep learning structure in the AI field.

BLSTM (Bidirectional Long Short-Term Memory Network): An LSTM is a time recursive neural network, and a BLSTM is a bidirectional LSTM and is a recurrent neural network model in machine learning.

Vocoder: A vocoder is an apparatus or software for sound signal processing and can encode an acoustic feature into a sound waveform.

There may be a plurality of application scenarios of the present invention. The application scenarios may include a scenario in which a speech of a specific emotion intensity is to be synthesized for a specified text, to be specific, a speech of a specific emotion intensity for an input text is synthesized based on the text and emotion intensity related information that are input by a user; may include a scenario in which a speech of a user-defined new emotion intensity may be re-generated based on emotion intensity related information input by the user for a speech input by the user; and may also include a human-computer interaction scenario, to be specific, the user inputs a statement, a speech, or a text, a reply text is determined based on the statement/speech/text input by the user, and a reply speech is synthesized based on user-defined emotion intensity related information, or in a human-computer interaction process, an intelligent device usually analyzes, determines, and inputs a synthesized speech of a corresponding emotion intensity. In this case, if the user is not satisfied with the speech synthesized and replied by the machine, a corresponding emotion intensity feature vector may be input to adjust an emotion intensity of the synthesized speech.

It should be noted that the "vector" mentioned in this specification may be considered as any information set including two or more than two constituent elements, and the element may be a value, a letter, a symbol, or the like.

FIG. 1A shows a natural language processing system according to an embodiment of the present invention. The natural language processing system includes user equipment 101a and a data processing device 102a.

The user equipment 101a may be a terminal device such as a personal computer, a notebook computer, a computer workstation, a smartphone or another type of mobile phone, a tablet computer device, a wearable device, a set-top box, or a game terminal. The user equipment 101a is an initiator of natural language data processing. The user equipment 101a serves as an initiator of a speech synthesis request, and a user usually initiates the request by using the user equipment.

The data processing device 102a may be a device or a server that has a data processing function, such as a cloud server, a network server, an application server, or a management server. There may be one or more data processing devices 102a, configured to jointly synthesize an emotion speech. When there are a plurality of data processing devices 102a, the data processing devices 102a may be placed in a centralized manner, or may be placed in physical space in a distributed manner and connected in a long-distance communication manner. Optionally, the data processing device 102a may further be connected to some other network devices, such as a database, a router, and a load balancer. The network devices are not shown in the accompanying drawings. The user equipment 101a and the data processing device 102a may be communicatively connected in a plurality of manners, including but not limited to any wired or wireless connection mode such as a wide area network, a local area network, or a point-to-point connection.

In a scenario in which a specified text is to be synthesized into a speech of a specific emotion intensity, the data processing device 102a receives, by using the interaction interface 105a, an input text (a target speech synthesis text) from the user equipment 101a, and emotion intensity related information selected to be input by the user. For example, the emotion intensity related information may be an emotion type and an emotion intensity feature vector of a to-be-synthesized text. A speech synthesis module 104a performs language data processing based on the emotion intensity related information and information about the to-be-synthesized text, to obtain an acoustic parameter used for speech synthesis. Speech synthesis for a reply text is performed based on the acoustic parameter. The emotion intensity related information may alternatively be obtained by the data processing device 102a or another device by analyzing the target speech synthesis text. For example, an emotion type or an emotion intensity of the target speech synthesis text is obtained by analyzing text content of the target speech synthesis text or context related information. Alternatively, a part of the foregoing information may be input by the user, and a part of the foregoing information may be obtained through autonomous analyzing by the data processing device 102a or another device.

In a human-computer interaction scenario, the data processing device 102a receives an input statement/speech/text from the user equipment 101a by using the interaction interface 105a. The speech synthesis module 104a determines a reply text based on the input statement/speech/text, and obtains emotion intensity related information of the reply text. The obtaining manner is the same as that in the foregoing scenario. Language data processing is performed based on the obtained emotion intensity related information and information about a to-be-synthesized text, to obtain an acoustic parameter used for speech synthesis. Speech synthesis for the reply text is performed based on the acoustic parameter. The reply text may be obtained from a memory 103a after the reply text is analyzed and determined by the speech synthesis module 104a based on the input statement/speech/text. For example, the emotion intensity related information may be an emotion type and an emotion intensity feature vector of the to-be-synthesized text. Related information of an emotion intensity specified by the user may be preset by the user, or may be selected by the user when the user inputs the statement/speech/text, or is selected or user-defined by the user after the user learns a to-be-synthesized reply text, or is set through manually inputting when the user is unsatisfied with an emotion type of a reply speech synthesized by an intelligent device, or is obtained through autonomous analyzing by the data processing device 102a or another device.

The data processing device 102a synthesizes a speech of a corresponding emotion intensity based on the emotion intensity feature vector or based on the emotion intensity feature vector and the emotion type, so that an emotion intensity of the synthesized speech can be more delicate and diversified. In a solution in which the user inputs the emotion intensity related information, the synthesized speech may also better meet a user requirement in terms of the emotion intensity, and the synthesized emotion speech is autonomously adjustable.

Figure 1B:
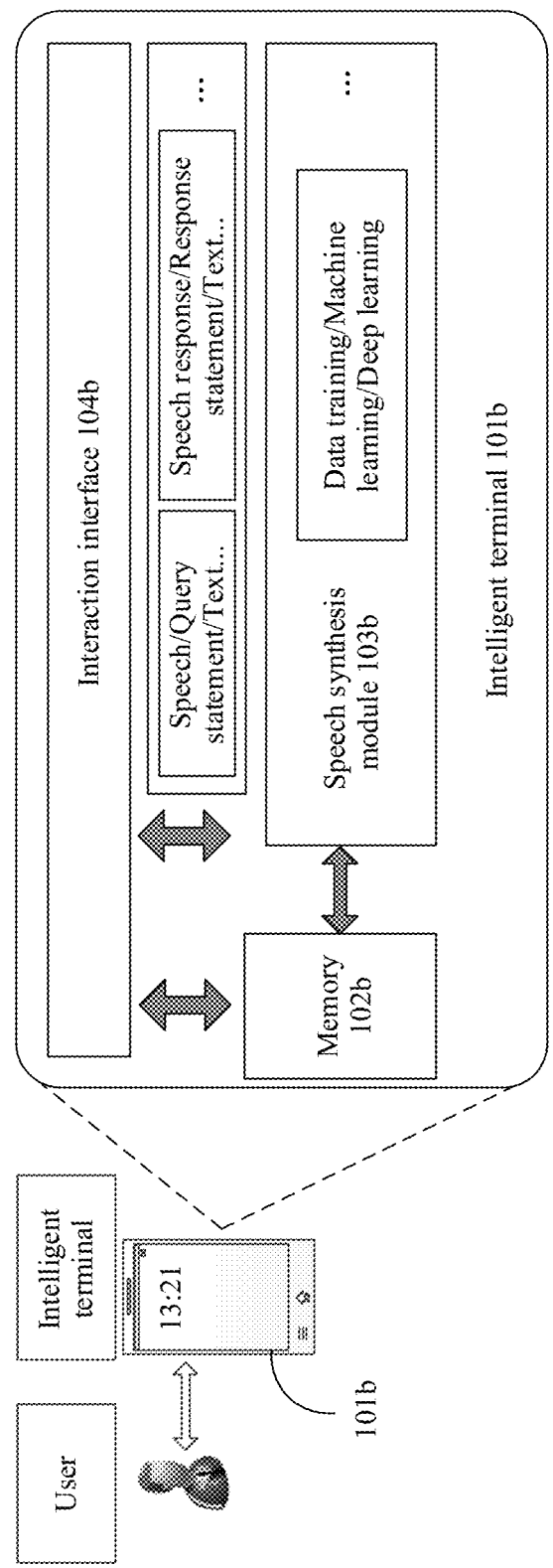
FIG. 1B is a schematic diagram of another implementation of a natural language processing system according to an embodiment of the present invention.

FIG. 1B shows another implementation of a natural language processing system according to an embodiment of the present invention. In this scenario, an intelligent terminal 101b directly serves as a data processing device, receives an input by a user, and directly performs processing on the input by the user by using hardware of the intelligent terminal 101b. A specific emotion speech synthesis process is similar to that in FIG. 1A. The intelligent terminal 101b may be a terminal device such as a personal computer, a notebook computer, a computer workstation, a smartphone, a tablet computer device, a wearable device, a set-top box, or a game console. The user equipment 101b receives, by using an interaction interface 104b, text information sent by the user, and obtains emotion intensity related information. A speech synthesis module 103b performs language data processing based on the emotion intensity related information and information about a to-be-synthesized text, to obtain an acoustic parameter used for speech synthesis. Alternatively, the user equipment 101b receives an input statement/speech/text of the user by using the interaction interface 104b. The speech synthesis module 103b obtains a reply text from a memory 102b based on the input statement/speech/text, obtains a corresponding acoustic feature vector based on the information about the to-be-synthesized text, an obtained emotion intensity feature vector, and an obtained emotion type, and synthesizes a speech of a corresponding emotion intensity, so that an emotion intensity of the synthesized speech can be delicate and diversified. In a solution in which the user inputs the emotion intensity related information, the synthesized speech may also better meet a user requirement in terms of the emotion intensity, and the synthesized emotion speech is autonomously adjustable.

The memory in either of FIG. 1A and FIG. 1B is disposed in the data processing device or the intelligent terminal. In a specific implementation process, the memory may alternatively be independent, may be disposed independent of the data processing device or the intelligent terminal, or disposed in another device. Similarly, in a possible implementation, the speech synthesis module in either of FIG. 1A and FIG. 1B may alternatively generate only an acoustic feature vector, and send the acoustic feature vector to another device for speech synthesis. A specific speech synthesis process in either of FIG. 1A and FIG. 1B may be described in detail in subsequent embodiments.

Figure 2:
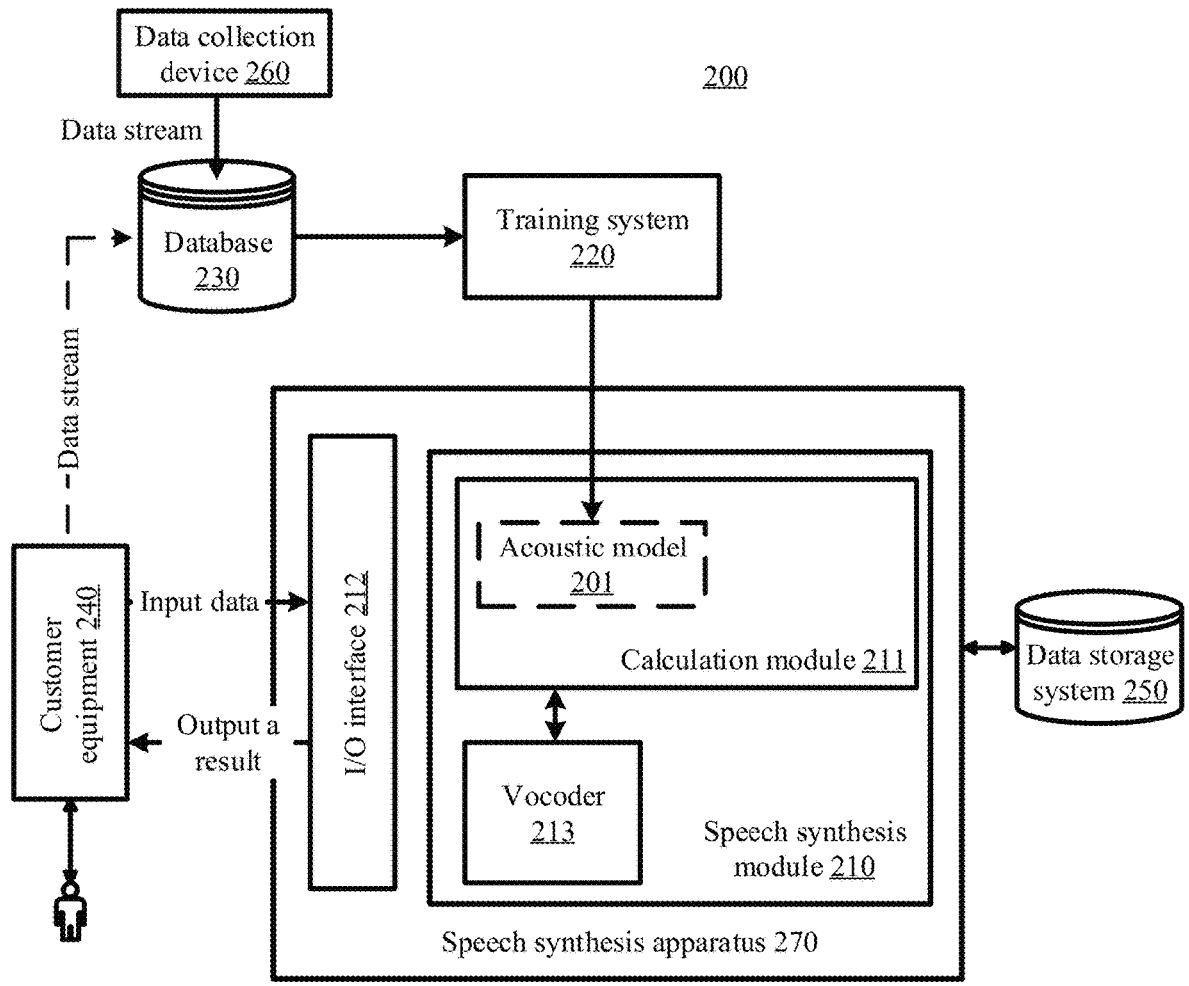
FIG. 2 is a schematic diagram of a system architecture including model training according to an embodiment of the present invention.

FIG. 2 shows a system architecture 200 including model training according to an embodiment of the present invention. The system architecture 200 includes a training system 220, a database 230, a data collection device 260, user equipment 240, a speech synthesis apparatus 270, and a data storage system 250. The data collection device 260 is configured to collect sample data and store the sample data into the database 230. The training system 220 trains and generates an acoustic model 201 based on the collected sample data in the database 230. The database 230 may be one or more underlying physical storage devices provided at a single location or distributed at a plurality of locations. The speech synthesis apparatus 270 may include a speech synthesis module 210 and an I/O interface 212. The I/O interface 212 is configured to receive a speech synthesis request of a user, the speech synthesis module 210 is configured to synthesize a corresponding speech according to the speech synthesis request, and the data storage system 250 is configured to provide a speech synthesis system with a text for speech synthesis. The sample data may include speech data and/or a content text corresponding to speech data. In addition, the sample data may further include text feature data based on a model training requirement. A specific training process and a specific training principle are described by using examples in a subsequent specific embodiment.

The speech synthesis module 210 may obtain, based on an input of the I/O interface 212, a text on which speech synthesis needs to be performed. Similar to that in FIG. 1a, the text for speech synthesis may be input by the user, or may be selected by the user from a local or remote data storage system 250 by using the speech synthesis system, or may be information (a speech or a text) input by the user in a human-computer interaction process, or may be selected from a local or remote data storage system 250 based on context information of a current conversation. Emotion intensity related information of the text for speech synthesis may include an emotion type and an emotion intensity feature vector, and may be obtained in a plurality of manners. The emotion intensity related information of the text for speech synthesis may be obtained through the I/O interface, or may be obtained by the speech synthesis apparatus 270 by analyzing the text for speech synthesis. This may be described in detail in a subsequent example description of the speech synthesis system. The speech synthesis module 210 obtains, by using the acoustic model 201 (in a subsequent specific embodiment description, a calculation module 211 may further include another module), an acoustic feature parameter of a corresponding emotion intensity of the text for speech synthesis based on the text on which speech synthesis needs to be performed and based on the corresponding emotion intensity related information of the text for speech synthesis. The acoustic feature parameter is usually represented in a form of a multi-dimensional vector. The speech synthesis module 210 uses a vocoder 213 to synthesize a speech of the corresponding emotion intensity based on the acoustic feature parameter. The I/O interface 212 is configured to receive an input of the user equipment 240 and output a synthesized speech of a specific emotion intensity to the user equipment 240. The acoustic model 201 may be a comprehensive acoustic model, or may be constituted by a plurality of acoustic models of different emotion types. A specific manner of generating the acoustic model is described in detail in a subsequent specific embodiment.

The speech synthesis apparatus 270 shown in FIG. 2 is merely a schematic structural diagram of a module. In an actual application scenario, the customer equipment 240 may be a user terminal, and the speech synthesis apparatus 270 and the data storage system 250 may be integrated into the customer equipment 240 when the customer equipment 240 has a comparatively strong data processing capability. In some embodiments, the speech synthesis apparatus 270 may alternatively be integrated into a remote processing system (for example, the data processing device 102a in FIG. 1A). Alternatively, related functions of the speech synthesis apparatus 270 may be distributed on each customer equipment 240 and in a remote processing system (for example, the data processing device 102a in FIG. 1A). For example, the calculation module 211 is disposed in the remote processing system, and the vocoder is disposed on the customer equipment. Alternatively, the database 230, the training system 220, and the data collection device 260 may be selectively integrated on a local device based on a data processing capability of the user equipment, for example, on the customer equipment 240, or may be integrated into a local remote processing system (for example, the data processing device 102a in FIG. 1A), or may be disposed on another server in the cloud or a network, or may be disposed as an independent device.

Figure 3:
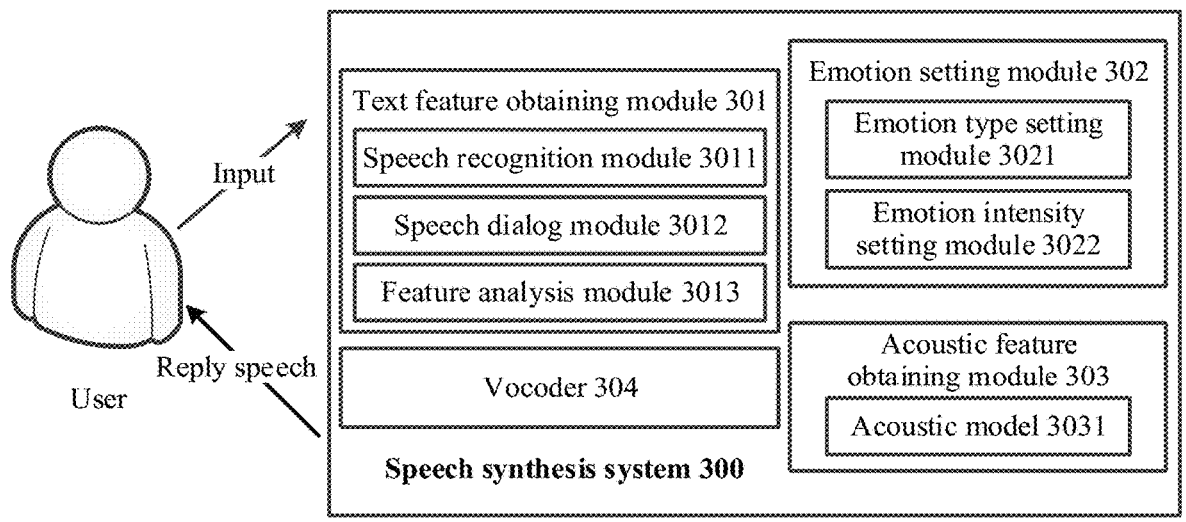
FIG. 3 is a schematic diagram of a specific implementation of a speech synthesis apparatus in FIG. 2.

FIG. 3 shows a specific implementation of the speech synthesis apparatus in FIG. 2. A speech synthesis apparatus 300 in FIG. 3 includes a text feature obtaining module 301, an emotion setting module 302, an acoustic feature obtaining module 303, and a vocoder 304. An I/O interface module is omitted and is not shown herein.

The text feature obtaining module 301 is mainly configured to determine a text on which speech synthesis needs to be performed, and analyze the determined text to generate a text feature corresponding to the determined text.

The text feature obtaining module 301 may determine, in a plurality of manners, the text on which speech synthesis needs to be performed. Determining of the text that needs to be performed speech synthesis mainly include: obtaining the text on which speech synthesis needs to be performed and that is input by a user. In other words, the user inputs the text on which speech synthesis needs to be performed. For the text on which speech synthesis needs to be performed in a human-computer interaction process, a reply text may be determined based on an input speech of the user, and in this case, the reply text is the text on which speech synthesis needs to be performed. In this case, an intelligent device may obtain, by using a remote database, the text on which speech synthesis needs to be performed, or an intelligent device determines the reply text based on the speech of the user, for example, an intelligent speech assistant on a mobile phone or on a wearable terminal that can make a sound, a smart speaker, or an intelligent device that can talk to a person. In a process of communication with a person, the reply text is determined based on the input speech of the user. After determining the text on which speech synthesis needs to be performed, the text feature obtaining module 301 performs text analysis based on the determined text to generate the text feature corresponding to the determined text.

When the text on which speech synthesis needs to be performed and that is input by the user, in other words, the user inputs the text on which speech synthesis needs to be performed, the text feature obtaining module 301 may include only a feature analysis module 3013.

The feature analysis module 3013 is configured to perform text analysis on the determined to-be-synthesized text to obtain the text feature. There may be a plurality of manners of obtaining the text feature, and there may be a plurality of types of the obtained text feature. This is not specially limited herein. For example, specifically, the text feature may be obtained by performing analysis, such as text regularization, word segmentation, part-of-speech annotation, syntax analysis, prosodic prediction, grapheme-to-phoneme (G2P) conversion, and duration information, on the determined text. The text feature may include a plurality of: a phoneme, a quantity of phonemes, a syllable, a quantity of syllables, a grammatical word, a prosodic word, a prosodic phrase, an intonational phrase, and duration.

When the text feature obtaining module 301 needs to be configured to perform speech synthesis based on the speech input by the user, the text feature obtaining module 301 may further include a speech recognition module 3011.

The speech recognition module 3011 is configured to recognize content of the speech input by the user, recognize the content of the speech as a text, and implement conversion from "speech" to "text".

When the text feature obtaining module 301 is configured to perform speech synthesis in a human-computer interaction scenario, the text feature obtaining module 301 may further include a speech dialog module 3012.

The speech dialog module 3012 may be configured to generate a reply text based on the recognized text input by the speech recognition module 3011. There are a plurality of manners for generating the reply text based on the recognized text. This is not limited herein. For example, syntax analysis and semantic analysis may be performed on the recognized text, so as to understand content of a voice (speech) of the user. Then, a corresponding reply text is generated based on the content of the voice of the user, and the reply text is transmitted to the feature analysis module 3013.

In addition to the foregoing implementation, when the text on which speech synthesis needs to be performed is the speech input by the user, an emotion intensity of the speech input by the user needs to be readjusted. The speech recognition module 3011 recognizes the content of the speech input by the user, recognizes the speech content as the text, and then performs feature analysis on the recognized text by using the feature analysis module 3013. In this case, the text feature obtaining module 301 may not include the speech dialog module 3012.

Alternatively, the text feature obtaining module 301 may directly obtain a to-be-synthesized text and a text feature parameter from an external device. In this case, the text feature obtaining module 301 may not include the speech recognition module 3011, the speech dialog module 3012, and the feature analysis module 3013.

The emotion setting module 302 is mainly configured to determine an emotion type and an emotion intensity of the current to-be-synthesized text. The emotion type or the emotion intensity of the to-be-synthesized text may be a value input by the user through determining, or may be determined by a speech synthesis system by analyzing the text.

The to-be-synthesized text mentioned in this embodiment of the present invention may be the reply text determined based on the input of the user, or may be a text that is directly input by the user and that is used to generate an emotion intensity speech, or text content corresponding to the speech.

The emotion setting module 302 may include an emotion type setting module 3021 and an emotion setting module 3022. The functions of the modules are described as follows.

(1) The emotion type setting module 3021 is configured to set the emotion type of the to-be-synthesized text, where the emotion type may be set through active selection or inputting by the user, or may be determined by the emotion type setting module 3021 based on content and/or context information of the current to-be-synthesized text. The emotion type may include a plurality of emotion types such as happy, anger, sadness, moving, and fear.

(2) The emotion setting module 3022 is configured to set an emotion intensity value of the current to-be-synthesized text, where the emotion intensity value may also be set through active selection or inputting by the user. The emotion intensity value may be low, medium, or high, or may further include different emotion intensities such as weak, very weak, strong, and very strong. Different degrees are corresponding to different values of an emotion intensity feature vector. The emotion intensity value may alternatively be in a form of an emotion intensity vector, and emotion intensities of different degrees are represented by using different vector values.

The emotion intensity value may alternatively be obtained by the emotion setting module 3022 by analyzing the to-be-synthesized speech text. The emotion intensity value may be in a form of an emotion intensity vector. The emotion setting module 3022 analyzes the text based on text content, a text context, or a preset determining policy, for example, different keywords are corresponding to different emotion intensity types; and determines a value of a corresponding emotion intensity feature vector.

A specific manner of setting the emotion intensity feature vector by the user is described in detail in a subsequent embodiment.

The acoustic feature obtaining module 303 is mainly configured to obtain, by using an acoustic model 3031, an acoustic feature vector of the current to-be-synthesized text based on the text feature, the emotion type, and the emotion intensity feature vector of the current to-be-synthesized text. The acoustic feature obtaining module 303 includes the acoustic model 3031. The acoustic model 3031 may be obtained through machine learning. A specific manner of training the acoustic model 3031 is described in detail in a subsequent embodiment. The acoustic feature vector obtained herein may be an acoustic feature vector used by a vocoder to perform speech synthesis in the art. A specific type of the acoustic feature vector depends on a vocoder type used in an acoustic model training process. For example, if a STRAIGHT vocoder is used, the acoustic feature vector may be a fundamental frequency (F0) feature, a line spectrum pair parameter (LSP), an unvoiced flag (UV) feature, or the like. For example, the acoustic feature may be:

log fundamental frequency (Log F0): 1 dimension;
line spectrum pair parameter (LSP): 41 dimensions; and
unvoiced flag (UV): 1 dimension.

The vocoder 304 is configured to receive the acoustic feature from the acoustic feature obtaining module 303, and synthesize the acoustic feature into a final emotion speech.

The speech synthesis system 300 in FIG. 3 is merely an example of the speech synthesis apparatus in FIG. 2. Therefore, like the speech synthesis apparatus in FIG. 2, the speech synthesis system 300 may be integrated into the customer equipment 240 in an actual application scenario. In some embodiments, the speech synthesis system 300 may alternatively be integrated into a remote processing system. Alternatively, related functions of the speech synthesis system 300 may be distributed on each customer equipment and in remote processing system. In this embodiment, after determining the emotion type of the text, the user may set, in a form of parameter setting, the emotion intensity of the speech that needs to be synthesized.

Figure 4:
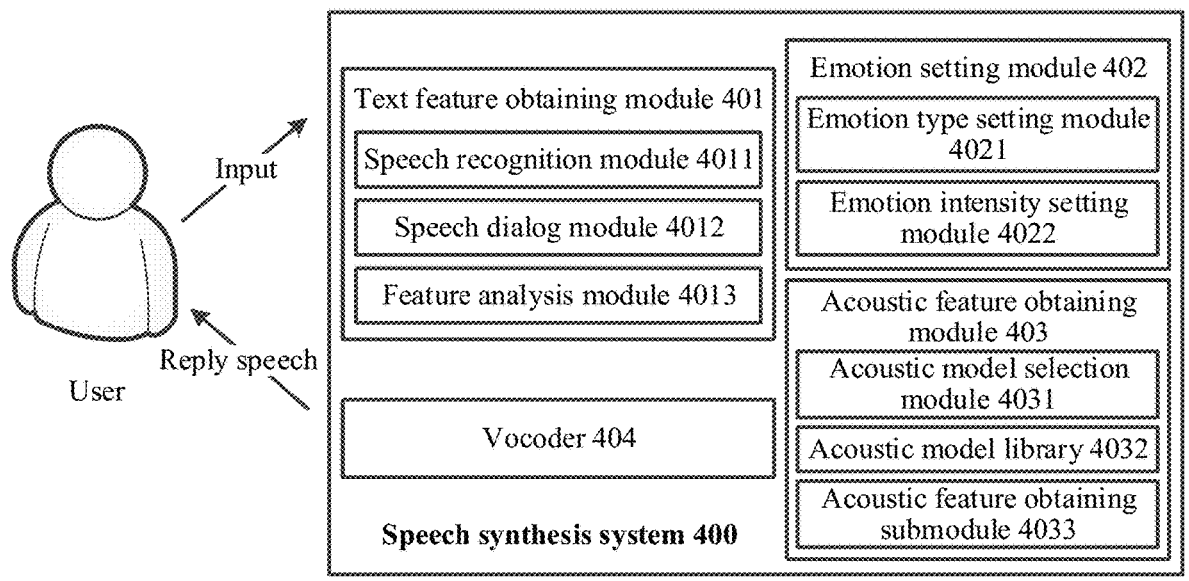
FIG. 4 is a schematic diagram of another specific implementation of a speech synthesis module in FIG. 2.

FIG. 4 shows another specific implementation of the speech synthesis module in FIG. 2. Similarly, the speech synthesis module includes a text feature obtaining module 401, an emotion setting module 402, an acoustic feature obtaining module 403, and a vocoder 404.

The text feature obtaining module 401, the emotion setting module 402, and the vocoder 404 perform same functions as the modules (301, 302, 304) with a same name described in FIG. 3. Therefore, details are not described herein again.

The acoustic feature obtaining module 403 is mainly configured to select an acoustic model corresponding to an emotion type based on the emotion type determined by the emotion setting module 402. For example, when it is determined that an emotion type of a to-be-synthesized text is "happy", an acoustic model corresponding to the emotion type "happy" is selected, and the selected acoustic model is used to obtain an acoustic feature vector of the current to-be-synthesized text based on a text feature and an emotion intensity feature vector of the current to-be-synthesized text. The acoustic feature obtaining module 403 includes an acoustic model selection module 4031, an acoustic model library 4032, and an acoustic feature obtaining submodule 4033. The acoustic model library 4032 includes a plurality of acoustic models corresponding to different emotion types. The plurality of acoustic models corresponding to the different emotion types may be separately obtained through machine learning based on sample data of specific emotion types. For example, a sample set used for training the acoustic model whose emotion type is "happy" is a speech file in which emotion types of various different emotion intensities are "happy" and content text corresponding to the speech file. A specific manner of training the acoustic model whose emotion type is "happy" is described in detail in a subsequent embodiment. The acoustic model selection module 4031 is configured to select the acoustic model corresponding to the emotion type from the acoustic model library 4032 based on the emotion type of the to-be-synthesized text. The acoustic feature obtaining submodule 4033 is configured to obtain the acoustic feature vector of the current to-be-synthesized text based on the text feature and the emotion intensity feature vector of the current to-be-synthesized text by using the selected acoustic model. In this embodiment, similarly, the user may set, in a form of parameter setting and text emotion type determining, an emotion type and an emotion intensity of a speech that needs to be synthesized.

Figure 5:
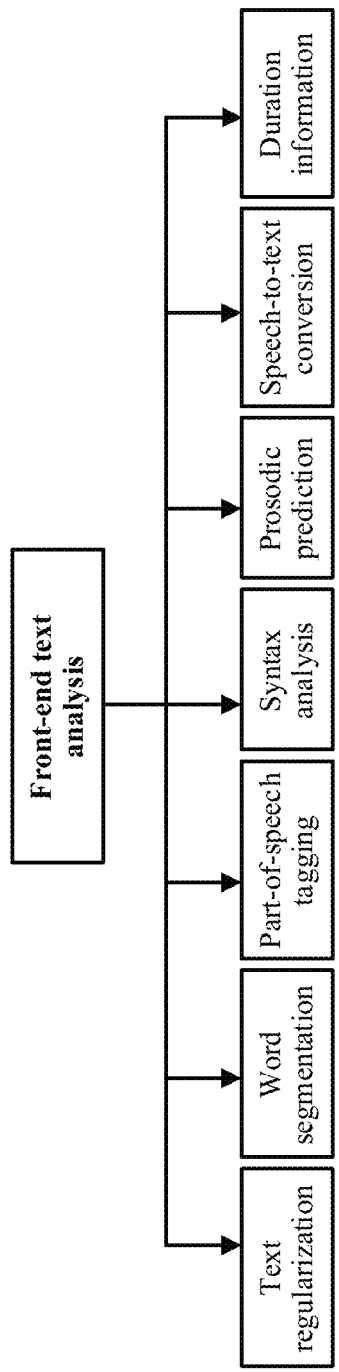
FIG. 5 is an example diagram of text feature analysis of a to-be-synthesized text in an emotion speech synthesis process according to an embodiment of the present invention.

FIG. 5 is an example diagram of text feature analysis of a to-be-synthesized text in an emotion speech synthesis process according to an embodiment of the present invention. Content listed in the figure is not intended to limit a specific implementation of the present invention. In specific solution implementation, content of text feature analysis of the to-be-synthesized text may be only some features in the figure, or is different from content of a feature that needs to be analyzed and that is listed in the figure, or is the same as some of the features that need to be analyzed.

An objective of the text feature analysis is to perform analysis such as text regularization, prosodic prediction, and duration prediction on an input text to obtain a text feature.

Text regularization: Ambiguity of non-Chinese characters in a real text, such as Arabic numerals, English symbols, various symbols, and the like are removed and the non-Chinese characters are converted into corresponding Chinese characters.

Word segmentation: In written Chinese, there is no segmentation mark between words and between phrases. Therefore, continuous Chinese character strings need to be segmented into a word sequence in this word segmentation step.

Part-of-speech tagging: Nouns, verbs, adjectives, and the like are tagged.

Syntax analysis: A syntax and semantic structure of each statement in the text is analyzed, a semantic center and an accent position or tone of the statement are determined, to provide important information for prosodic processing.

Prosodic prediction: Prosodic structures of different levels, such as a prosodic word, a prosodic phrase, and an intonation phrase, in a statement are predicted.

Grapheme-to-phoneme (G2P) conversion: Grapheme-to-phoneme (G2P) conversion is a process of converting Chinese letters into their pronunciations.

Duration information: Duration information of a syllable, an initial, a vowel, a phoneme, a status, and the like in a speech is predicted.

After the foregoing steps are performed, an obtained text feature includes a phoneme, a quantity of phonemes, a syllable, a quantity of syllables, a grammatical word, a prosodic word, a prosodic phrase, an intonation phrase, duration, and the like. A specific implementation of this step is that the generated text feature is in a unit of phoneme, and each phoneme is used to generate one feature vector including the foregoing features.

Figure 6:
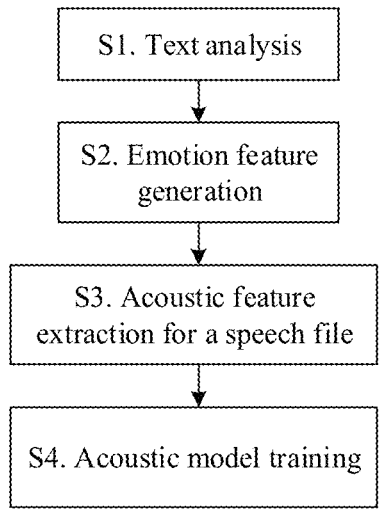
FIG. 6 is a schematic diagram of an implementation process of a training system 220 in FIG. 2.

FIG. 6 shows an implementation procedure of the training system 220 in FIG. 2. In an implementation, the training system 220 processes training sample data in the database 230 to generate the acoustic model 201. The acoustic model 201 may be a comprehensive acoustic model, or may be constituted by a plurality of acoustic models of different emotion types. In a specific implementation of the present invention, the acoustic model 201 may be obtained through machine learning. This is not limited herein. The training sample data obtained by the training system 220 from the database 230 may include speech data and a content text corresponding to the speech data, and optionally may further include text feature data such as grapheme-to-phoneme (G2P) conversion of the text and marked prosodic structure data.

When the training system generates a plurality of acoustic models of different emotion types based on classification of different emotion types, a training process is as follows.

S1. Text analysis. Text feature analysis is performed on text content corresponding to speech data in a training sample. The analyzed content includes all or some features such as text regularization, word segmentation, part-of-speech annotation, syntax analysis, prosodic prediction, grapheme-to-phoneme (G2P) conversion, and duration information. An analysis manner in this part may be the same as a process of text analysis performed on the to-be-synthesized text in the speech synthesis process in FIG. 3 or FIG. 4, and analyzed text feature content is also the same as that in the speech synthesis process in FIG. 3 or FIG. 4. A specific example manner has been described based on FIG. 5. Details are not described herein again. When the sample data includes only the speech data, the speech data may be recognized first, the speech data is recognized as corresponding text information, and then the foregoing text feature analysis is performed.

S2. Emotion feature generation. This step mainly includes: obtaining an emotion type of the speech data, generating an emotion intensity feature vector by using the speech data in the training sample, and determining an emotion intensity feature vector corresponding to each speech file. The emotion type of the speech data in the training sample may be carried in training sample information, in other words, may be determined in advance, or may be determined by the training system based on text content analysis of the training sample. The emotion types may be classified into a plurality of different types. For example, the emotion types may be classified into a plurality of types such as happy, anger, sadness, moving, and fear.

Figure 7:
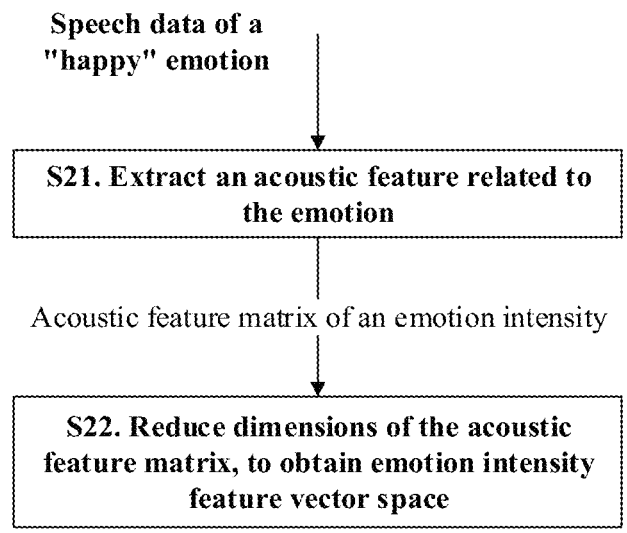
FIG. 7 is a schematic diagram of a process of constructing emotion intensity feature vector space of "happy"

FIG. 7 shows an example of describing a process of constructing emotion intensity feature vector space of "happy".

S21. Extract an acoustic feature related to an emotion. Obtain an emotion type of speech data, and extract an acoustic statistical feature related to an emotion of speech data of each "happy" training sample from the speech data of each "happy" training sample, to generate an acoustic statistical feature vector.

The acoustic statistical feature related to the emotion is not limited to speech energy, a speech rate, a fundamental frequency, and the like. In this embodiment, three types of features, namely, energy, a speech rate, and a logarithmic fundamental frequency, are used as examples only but are not intended to limit a type of the acoustic feature extracted in S21. Specific parameters of the three types of features are shown in Table 1, and may include an average value, a maximum value, and a change amplitude of the speech energy, an average speech rate, and an average value, a maximum value, and a change amplitude of the logarithmic fundamental frequency. In other words, for each training sample whose emotion type is "happy", a 7-dimensional acoustic statistical feature vector is generated, and a change amplitude is a difference between a maximum value and a minimum value. If a training sample set includes N training samples of "happy", an N×7 acoustic statistical feature matrix is finally obtained in S21.

TABLE 1

| Energy (statistical value) | Average value (1 dimension) |
| | Maximum value (1 dimension) |
| | Change amplitude (1 dimension) |
| Speech rate (statistical value) | Average value (1 dimension) |
| Logarithmic fundamental frequency (statistical value) | Average value (1 dimension) |
| | Maximum value (1 dimension) |
| | Change amplitude (1 dimension) |

S22. Reduce dimensions of the acoustic statistical feature matrix to obtain the emotion intensity feature vector space.

Dimension reduction processing is performed on the obtained acoustic statistical feature matrix in step S22, so as to generate a low-dimensional matrix based on the acoustic statistics feature matrix. A dimension reduction method may use an existing dimension reduction algorithm in machine learning, such as a principal component analysis algorithm, a multidimensional scaling algorithm, and a metric mapping algorithm.

Figure 8:
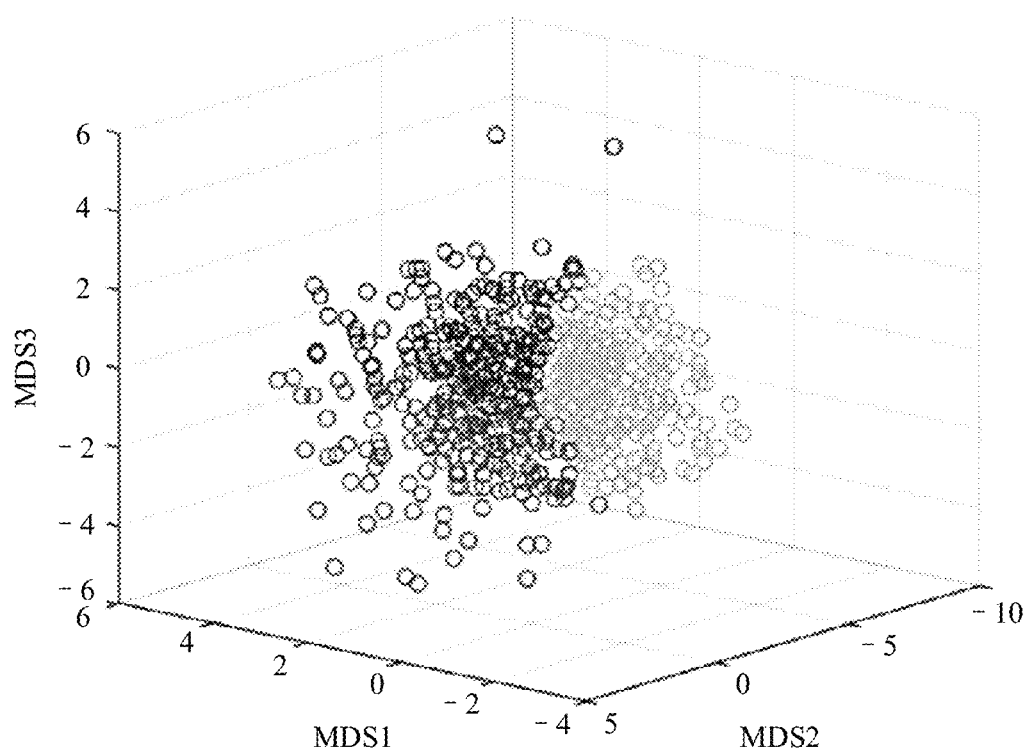
FIG. 8 is a schematic diagram of constructed emotion intensity feature vector space according to an embodiment of the present invention.

Herein, for example, the multidimensional scaling (MDS, multidimensional scaling) algorithm is used for dimension reduction. A characteristic of the MDS is to maintain a data difference during dimension reduction. In other words, dimension reduction keeps a distance relationship in high-dimensional space and a distance relationship in low-dimensional space unchanged. For example, for the N×7 acoustic statistical feature matrix finally obtained in step S21, it is assumed that a target dimension of dimension reduction processing is 3, a final calculation result of the MDS is a feature matrix Z ($Z \in R^{N \times 3}$) obtained after dimension reduction. In other words, Z is an N×3 feature matrix, R is a real number, and each row of Z is corresponding to a result obtained after dimension reduction of a 7-dimensional emotion intensity feature of one sample. For example, an $i^{th}$ row of Z is an emotion intensity feature vector obtained after dimension reduction of a 7-dimensional acoustic statistics feature vector of an original $i^{th}$ sample, where $i \in [1, N]$. As shown in FIG. 8, 3-dimensional space covered by Z is emotion intensity feature space, and (MDS1, MDS2, and MDS3) are three feature dimensions of the 3-dimensional space covered by Z. Each emotion intensity feature vector may be defined as one point in the space. As shown in FIG. 8, samples with similar intensities are also adjacent in the feature space. In a 3-dimensional emotion intensity feature vector obtained through dimension reduction, an emotion intensity is positively correlated to the first dimensional feature vector and the second dimensional feature vector (namely, MDS1 and MDS2), and is negatively correlated to the third dimensional feature vector (MDS3). In other words, the emotion intensity is increased with an increase of the first dimensional value and an increase of the second dimensional value, and is decreased with an increase of the third dimensional value.

The 3-dimensional vector herein is merely an implementation, and in the dimension reduction step, an emotion intensity feature vector of another quantity of dimensions may alternatively be generated.

Dimension reduction processing is performed on the feature matrix obtained in step S22, so that a relationship between an emotion intensity and a vector value can be more intuitive and adjustable.

FIG. 7 shows only a process of constructing emotion intensity feature vector space of a "happy" emotion. Processes of constructing emotion intensity feature vector space of other emotion types are similar, and are not listed one by one herein. In addition to unified extraction of an acoustic feature and unified dimension reduction processing on a plurality of samples, acoustic feature analysis and dimension reduction processing may alternatively be performed on a single sample for a specific emotion type. Herein, the vector dimension may be adjusted based on a requirement in a specific actual application and in the dimension reduction method, a dimension reduction algorithm may be selected based on a requirement in a specific actual application. When different dimension reduction algorithms are used and different emotion intensity feature vector dimensions are selected, emotion intensity change effects brought by adjusting the dimensions are different.

Through dimension reduction processing, an emotion intensity feature vector used in acoustic model training is simpler, and manipulability of setting an emotion intensity of an obtained acoustic model is improved.

S3. Acoustic feature extraction for a speech file.

This step specifically includes: extracting a corresponding acoustic feature vector for each training sample (speech file). The acoustic feature vector in this step is an acoustic feature vector required for speech synthesis, and the acoustic feature vector may be usually provided for the vocoder to generate a corresponding speech file. For example, if a STRAIGHT vocoder is used, an acoustic feature may be a fundamental frequency (F0) feature, a line spectrum pair parameter (LSP), an unvoiced flag (UV) feature, or the like. In a specific implementation of this embodiment of the present invention, a feature parameter and a dimension of the acoustic feature are shown as follows:

log fundamental frequency (Log F0): 1 dimension;
line spectrum pair parameter (LSP): 41 dimensions; and
unvoiced flag (UV): 1 dimension.

S4. Acoustic model training.

Specifically, in this step, the text feature and the emotion intensity feature vector of the training sample of the specific emotion type that are respectively generated in S1 and S2 are used as an input, the acoustic feature of the training sample of this emotion type extracted in S3 is used as an output, and the acoustic model of this emotion type is trained in a machine learning manner.

For example, the acoustic model may be obtained through training by using a BLSTM-based deep neural model. For each speech training sample, a feature matrix obtained by concatenating the text feature generated by using a content text and the emotion intensity feature vector that is corresponding to the speech file and that is generated in S2 is used as an input of the acoustic model, and the acoustic feature vector matrix generated in S3 is used as an output of the acoustic model. Through a large quantity of training speech samples, the acoustic model continuously updates a model parameter until a target training condition is met. In addition, the acoustic model may alternatively be obtained by training a neural network model, and the neural network model specifically includes a deep neural network model, such as a convolutional neural network, or the acoustic model may be obtained in another machine learning manner, such as a Hidden Markov Model HMM.

If a plurality of emotion types are obtained through classification, a plurality of acoustic models of different emotion types are generated. In a using process, different acoustic models are selected to be used based on determined emotion types of target synthetic texts.

In addition to separate training of acoustic models of different emotion types based on training samples of a same emotion type, a training system may further construct a comprehensive acoustic model based on samples of various emotion types. In this solution, steps S1 and S3 are unchanged, and steps S2 and S4 are as follows.

S2. Emotion feature generation. This step mainly includes: obtaining an emotion type of the speech data, generating an emotion intensity feature vector by using the speech data in the training sample, and determining an emotion intensity feature vector corresponding to each speech file.

S21. Obtain training samples of various emotion types, and extract an acoustic feature related to an emotion. An emotion type of speech data of each training sample is recorded, and an acoustic statistical feature related to the emotion of the speech data of each training sample is extracted, to generate an acoustic statistical feature vector. A manner of generating the acoustic statistics feature vector is the same as the manner of generating the acoustic statistics feature vector based on the training samples of the same emotion type.

S22. Reduce dimensions of an acoustic statistical feature matrix to generate the emotion intensity feature vector space.

Dimension reduction processing is performed on the obtained acoustic feature matrix in step S22, so as to generate a low-dimensional matrix based on the acoustic statistics feature matrix. A dimension reduction method may use an existing dimension reduction algorithm in machine learning, such as a principal component analysis algorithm, a multidimensional scaling algorithm, and a metric mapping algorithm.

S4. Acoustic model training.

Specifically, in this step, the text feature and the emotion intensity feature vector of the training sample that are respectively generated in S1 and S2, and the emotion type of the training sample are used as an input, the acoustic feature of the training sample extracted in S3 is used as an output, and an acoustic model of a comprehensive emotion type is trained in a machine learning manner.

The comprehensive acoustic model is generated by using emotion types of a plurality of training samples. In a using process, a corresponding acoustic feature vector is obtained by using a determined emotion type of a target synthetic text and a specified emotion intensity feature vector as an input, so as to generate a speech of a required emotion intensity.

Figure 9:
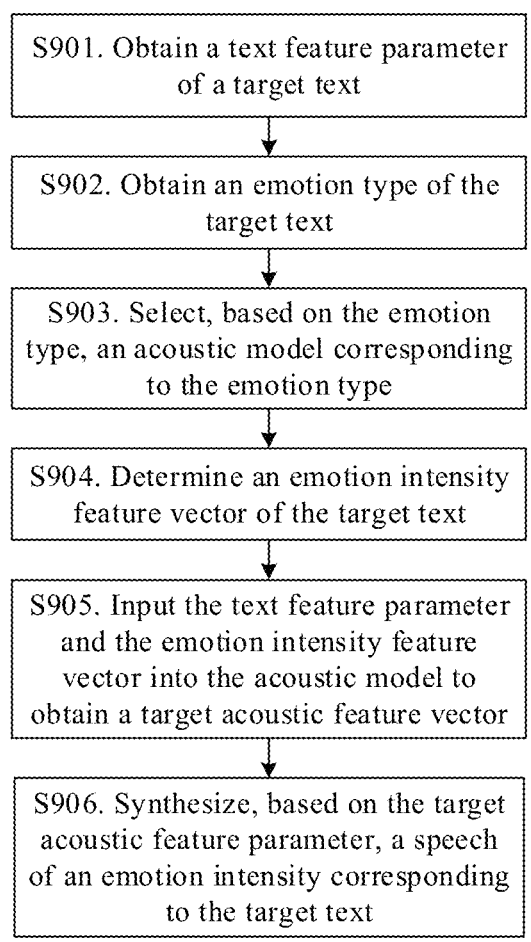
FIG. 9 is a schematic flowchart of an emotion speech synthesis method according to an embodiment of the present invention.

FIG. 9 shows a procedure of an emotion speech synthesis method according to an embodiment of the present invention. The emotion speech synthesis method is specifically a method for speech synthesis based on speech models obtained by a plurality of training samples of different emotion types.

S901. Obtain a text feature parameter of a target text.

Specifically, the target text is a to-be-synthesized speech text. When the method is applied to speech synthesis performed on a text input by a user, the target text is the text input by the user. When the method is applied in a human-computer interaction scenario, an intelligent device recognizes, based on a speech sent by the user, content of the speech input by the user, recognizes the speech content as a text, implements conversion from "speech" to "text", and determines a reply text based on the recognized text. A specific determining manner may be performing syntax analysis and semantic analysis on the recognized text, so as to understand content of a voice (speech) of the user. Then a corresponding reply text is generated based on the content of the voice of the user. The reply text is a to-be-synthesized text.

Text analysis is performed on the to-be-synthesized text to obtain a text feature. Specifically, the text feature may be obtained by performing analysis, such as text regularization, word segmentation, part-of-speech annotation, syntax analysis, prosodic prediction, grapheme-to-phoneme (G2P) conversion, and duration information, on the determined text. The text feature may include a plurality of: a phoneme, a quantity of phonemes, a syllable, a quantity of syllables, a grammatical word, a prosodic word, a prosodic phrase, an intonational phrase, and duration. "The plurality of" generally refers to two or more than two.

S902. Obtain an emotion type of the target text.

Specifically, an emotion type of the to-be-synthesized text is set. The emotion type may be set through active selection or inputting by the user, or may be determined based on content and/or context information of the current to-be-synthesized text. The emotion type may include a plurality of emotion types such as happy, anger, sadness, moving, and fear.

S903. Select, based on the emotion type, an acoustic model corresponding to the emotion type.

The acoustic model corresponding to the emotion type is selected based on the determined emotion type, and the acoustic model is pre-trained. The manner of training the acoustic model of the specific emotion type has been described above. Details are not described herein again.

S904. Determine an emotion intensity feature vector of the target text.

This step may include two implementations.

(1) Receive an emotion intensity value input by the user, to determine a corresponding emotion intensity feature vector.

An emotion intensity feature vector of the current to-be-synthesized text is set, and the emotion intensity feature vector may also be set through active selection or inputting by the user. Different emotion intensities of the emotion intensity feature vector may be low, medium, and high, or may further be weak, very weak, strong, and very strong. The emotion intensity feature vector may alternatively be in a form of an emotion intensity vector, and emotion intensities of different degrees are represented by using different vector values.

A specific manner of setting the emotion intensity feature vector depends on the manner of training the acoustic model. The manner of training the acoustic model of the specific emotion type has been described in the foregoing. In this training manner, a text feature and an emotion intensity feature vector of a training sample of a specific emotion type is used as an input, an extracted acoustic feature of the training sample of this emotion type is used as an output, and an acoustic model of this emotion type is trained in a machine learning manner. Therefore, in a speech synthesis process, a form of an emotion intensity feature vector is usually the same as the emotion intensity feature vector used in the acoustic model training process. For example, in the model training process, if the used emotion intensity feature vector is a 3-dimensional feature vector, Z=[MDS1, MDS2, and MDS3], and an emotion intensity is positively correlated to the first dimensional feature vector and the second dimensional feature vector (namely, MDS1 and MDS2), and is negatively correlated to the third dimensional feature vector (MDS3), the emotion intensity feature vector finally determined based on the input by the user in S904 is also a 3-dimensional vector, and the 3-dimensional vector may be three corresponding parameter values directly set by the user. If the emotion intensity needs to be increased, values of MDS1 and MDS2 may be adjusted to be larger, and a value of MDS3 may be adjusted to be smaller. On the contrary, if the emotion intensity needs to be decreased, MDS1 and MDS2 need to be adjusted to be smaller, and MDS3 needs to be adjusted to be larger. For example, if the emotion control vector is [0.368146491, −0.35448816, −0.082456155], it indicates that a strength of a statement is medium, and is neither strong nor weak. To increase an emotion of the target synthetic text, the emotion feature vector may be adjusted to [4, 4, −4], and to decrease the emotion, the emotion feature vector may be adjusted to [−4, −4, 4].

Figure 11:
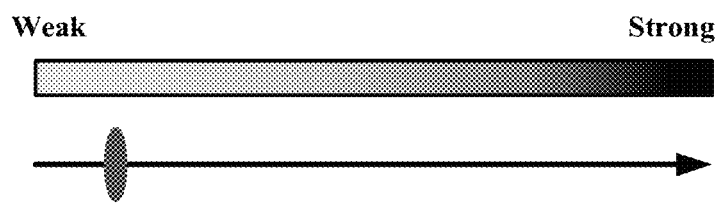
FIG. 11 is a schematic diagram of a manner of setting an emotion intensity feature vector according to an embodiment of the present invention.

In addition to a manner of setting the value, the emotion intensity feature vector may alternatively be set in a manner of a progress bar representing from weak to strong, as shown in FIG. 11. If the manner of training the acoustic model is still shown in the foregoing example, different locations in FIG. 11 are corresponding to different values of the 3-dimensional vector. In this manner, the user does not need to know a change relationship between different dimension values and emotion intensities, and needs to only adjust a location of the progress bar based on a user requirement. Then, a device determines, based on an intensity degree selected by the user, an emotion strength feature vector value corresponding to the intensity degree.

The emotion intensity feature vector is only a possible implementation. A sample data type used for the emotion intensity feature vector based on training of the acoustic model may be in another dimension, for example, 2 dimensions or 4 dimensions.

(2) Analyze the target text to determine an emotion intensity feature vector.

In addition to determining of the emotion intensity of the to-be-synthesized text through inputting by the user, the emotion intensity feature vector of the current to-be-synthesized text may alternatively be determined in a manner of autonomous analyzing by the device. To be specific, the emotion intensity feature vector of the current to-be-synthesized text is obtained by analyzing the to-be-synthesized speech text. The text may be analyzed based on text content, a text context, or a preset determining policy, for example, different keywords are corresponding to different emotion intensity types; and a value of a corresponding emotion intensity feature vector is determined.

S905. Input the text feature parameter and the emotion intensity feature vector into the acoustic model to obtain a target acoustic feature vector.

Specifically, an acoustic feature vector of the current to-be-synthesized text is obtained based on the text feature and the emotion intensity feature vector of the current to-be-synthesized text by using the selected acoustic model. An acoustic feature vector type obtained in this step also depends on the acoustic model. In other words, the acoustic feature vector type obtained in this step is corresponding to an acoustic feature vector type used in a training process of the acoustic model. For example, if the acoustic feature used in the training process is a logarithmic fundamental frequency (Log F0): 1 dimension, a line spectrum pair parameter (LSP): 41 dimensions, and an unvoiced flag (UV): 1 dimension, an acoustic feature obtained by using the acoustic model in step S906 is a logarithmic fundamental frequency (Log F0): 1 dimension, a line spectrum pair parameter (LSP): 41 dimensions, and an unvoiced voice flag (UV): 1 dimension.

S906. Synthesize, based on the target acoustic feature vector, a speech of an emotion intensity corresponding to the target text.

Specifically, the speech of the emotion intensity corresponding to the corresponding target text is generated by using a vocoder based on the acoustic feature vector.

According to the foregoing method, the user can independently set an emotion intensity of a target speech synthesis text, and set a parameter of the emotion intensity to be continuously adjustable, so that an emotion speech with a slight emotion intensity difference can be generated, instead of simply classifying speech emotion types into happy, angry, sad, and the like, or simply obtaining only a limited quantity of types such as strong, less strong, and weak through classification for a specific emotion type.

Figure 10:
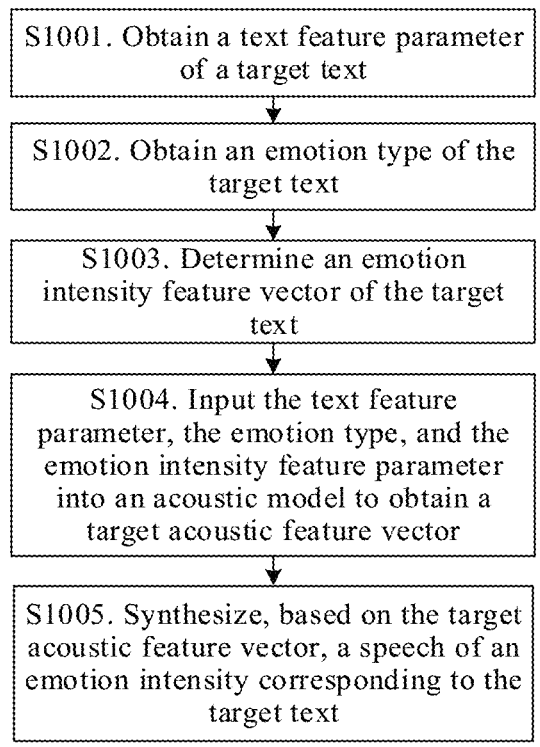
FIG. 10 is a schematic flowchart of another emotion speech synthesis method according to an embodiment of the present invention.

FIG. 10 shows a procedure of another emotion speech synthesis method according to an embodiment of the present invention. The emotion speech synthesis method is specifically a method for speech synthesis based on a comprehensive speech model obtained by training samples of a plurality of emotion types. For an implementation progress, S1001 and S1002 are respectively the same as S901 and S902 in FIG. 9, S1003 is the same as S904 in FIG. 9, and S1005 is the same as S906 in FIG. 9. Therefore, only step S1004 is described herein.

S1004. Input the text feature parameter, the emotion type, and the emotion intensity feature vector of the target text into the acoustic model to obtain a target acoustic feature vector.

The method corresponding to FIG. 10 is a speech synthesis method based on the comprehensive acoustic model. Therefore, an acoustic model does not need to be selected based on an emotion type of a target synthetic text. The training process of the comprehensive acoustic model has been described above. In the training process, the acoustic feature vector of the current to-be-synthesized text by using the comprehensive acoustic model is obtained based on the emotion type, the emotion intensity feature vector, and the text feature of the training sample. An acoustic feature vector type obtained in this step also depends on the acoustic model. In other words, the acoustic feature vector type obtained in this step is corresponding to an acoustic feature vector type used in the training process of the acoustic model.

The acoustic model used in this implementation is different from that used in the method in FIG. 9, but a same technical effect is achieved. In both the implementations, the user can independently set an emotion intensity of a target speech synthesis text, and set a parameter of the emotion intensity to be continuously adjustable, so that an emotion speech with a slight emotion intensity difference can be generated, instead of simply classifying speech emotion types into happy, angry, sad, and the like, or simply obtaining only a limited quantity of types such as strong, less strong, and weak through classification for a specific emotion type.

Figure 12:
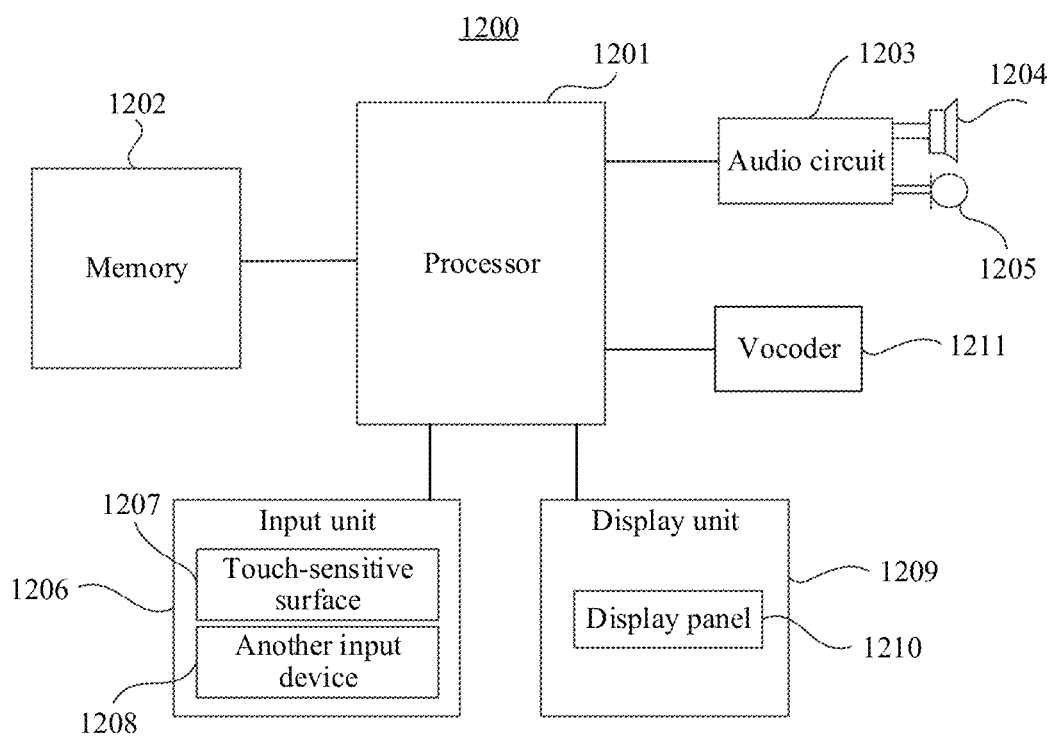
FIG. 12 is a schematic structural diagram of an emotion speech acoustic feature obtaining device according to an embodiment of the present invention.

FIG. 12 is a structural diagram of an emotion speech acoustic feature obtaining device according to an embodiment of the present invention. As shown in FIG. 12, an emotion speech acoustic feature obtaining device 1200 may include one or more processors 1201 and one or more memories 1202. In specific implementation, the emotion speech acoustic feature obtaining device 1200 may further include components such as a vocoder 1211, an audio circuit 1203, an input unit 1206, and a display unit 1209. The processor 1201 may be connected to components such as the memory 1202, the voice coder 1211, the audio circuit 1203, the input unit 1206, and the display unit 1209 by using a bus. Descriptions are separately provided as follows.

The processor 1201 is a control center of the emotion speech acoustic feature obtaining device 1200, and is connected to various components of the emotion speech acoustic feature obtaining device 1200 by using various interfaces and buses. In a possible embodiment, the processor 1201 may further include one or more processing units. The processor 1201 may perform speech synthesis by running or executing a software program (an instruction) and/or a module stored in the memory 1202 and invoking data stored in the memory 1202. In this way, the emotion speech acoustic feature obtaining device 1200 synthesizes an emotion speech for a target text.

The memory 1202 may include a high-speed random access memory, or may include a non-volatile memory, for example, at least one magnetic disk storage, a flash memory, or another volatile solid state storage. Correspondingly, the memory 1202 may further include a memory controller to provide access by the processor 1201 and the input unit 1207 to the memory 2012. The memory 1202 may be specifically configured to store the software program (the instruction) and user data.

The audio circuit 1203 may provide an audio interface between the emotion speech acoustic feature obtaining device 1200 and a user, and the audio circuit 1203 may further be connected to a loudspeaker 1204 and a microphone 1205. In one aspect, the microphone 1205 may collect a sound signal of the user, and convert the collected sound signal into an electrical signal. After receiving the electrical signal, the audio circuit 1203 converts the electrical signal into audio data (in other words, forms an input speech of the user), and then transmits the audio data to the processor 1201 for speech processing. In another aspect, the processor 1201 determines a reply text based on the input speech of the user and transmits an emotion speech to the audio circuit 1203 after synthesizing the emotion speech based on the reply text and an emotion intensity set by the user. The audio circuit 1203 may transmit, to the loudspeaker 1204, an electrical signal obtained by converting received audio data (in other words, a reply speech), and the loudspeaker 1204 converts the electrical signal into a sound signal for output, so as to present the reply speech to the user. This achieves an objective of providing, by the emotion speech acoustic feature obtaining device 1200, a speech of a specified emotion intensity to the user.

The input unit 1206 may be configured to receive an emotion intensity feature vector input by the user, or receive a text that is specified by the user and on which speech synthesis needs to be performed. Specifically, the input unit 1207 may include a touch-sensitive surface 1207 and another input device 1208. The touch-sensitive surface 1207 is also referred to as a touch display screen or a touchpad, and may collect a touch operation of the user on or near the touch-sensitive surface 1207, and drive a corresponding connection apparatus based on a preset program. Specifically, the another input device 1208 may include but is not limited to one or more of a physical keyboard, a function key, a trackball, a mouse, and a joystick.

The display unit 1209 may be configured to display information input by the user or display information (for example, a related identifier or character for replying to a speech) provided by the emotion speech acoustic feature obtaining device 1200 for the user and various graphical user interfaces of the emotion speech acoustic feature obtaining device 1200, such as an interface used to input an emotion intensity parameter or set an emotion intensity progress bar. These graphical user interfaces may include a graphic, a text, an icon, a video, and any combination thereof. Specifically, the display unit 1209 may include a display panel 1210. Optionally, the display panel 1210 may be configured in a form of a liquid crystal display (Liquid Crystal Display, LCD), an organic light-emitting diode (Organic Light-Emitting Diode, OLED), or the like. Although in FIG. 12, the touch-sensitive surface 1207 and the display panel 1210 are used as two independent components, in some embodiments, the touch-sensitive surface 1207 and the display panel 1210 may be integrated to implement input and output functions.

A person skilled in the art may understand that the emotion speech acoustic feature obtaining device 1200 in this embodiment of the present invention may include more or fewer components than those shown in the figure, or combine some components, or have different component arrangements. For example, the emotion speech acoustic feature obtaining device 1200 may further include a communications module, a camera, and the like. Details are not described herein.

Specifically, the processor 1201 may implement the emotion speech acoustic feature obtaining method in the embodiments of the present invention by running or executing a software program (an instruction) stored in the memory 1202 and invoking data stored in the memory 1202. The processor 1201 obtains a text feature parameter of a target text, where the text feature parameter of the target text may be directly received and obtained from another module or another device, or the text feature parameter of the target text may be obtained by the processor by analyzing the target text; obtains an emotion type of the target text, where similarly, the emotion type of the target text may be directly received and obtained from another module or another device, for example, manually input by a user, or may be obtained by the processor by analyzing a text, where the analyzing of the text may be analyzing content of the target text, or may be analyzing a context of the target text, or may be a combination thereof selects, based on the emotion type, an acoustic model corresponding to the emotion type; obtains an emotion intensity feature vector of the target text; and inputs the text feature parameter and the emotion intensity feature vector into the acoustic model to obtain a target acoustic feature vector. The emotion intensity feature vector of the target text may be obtained based on an input of the user, for example, in a similar form shown in FIG. 11, or may be obtained through manually inputting a parameter by the user, or may be obtained by sending, to the processor, an emotion intensity feature vector value that is of the target text and that is determined by analyzing the target text by another module or another device, or may be obtained by analyzing the target text by the processor to determine an emotion intensity feature vector value of the target text.

Alternatively, that the processor 1201 in this embodiment of the present invention performs the emotion speech acoustic feature obtaining method may be: obtaining, by the processor 1201, a text feature parameter of a target text; obtaining an emotion type of the target text; and obtaining an emotion intensity feature vector of the target text; and inputting the text feature parameter, the emotion type, and the emotion intensity feature vector of the target text into an acoustic model to obtain a target acoustic feature vector.

The emotion speech acoustic feature obtaining device 1200 in this embodiment of the present invention may further include the vocoder 1211, and the vocoder 1211 is configured to synthesize, based on the target acoustic feature vector, a speech of an emotion intensity corresponding to the target text. Alternatively, the emotion speech acoustic feature obtaining device 1200 may send the emotion intensity feature vector obtained by the processor 1201 to another speech synthesis device for emotion speech synthesis.

For specific implementation details of performing the emotion speech acoustic feature obtaining method by the processor 1201, refer to related steps in the foregoing method embodiments. Details are not described herein again.

It should be noted that FIG. 12 shows merely an implementation of the emotion speech acoustic feature obtaining device according to the present invention. The processor 1201 and the memory 1202 in the emotion speech acoustic feature obtaining device 1200 may be integrated for deployment in a possible embodiment.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, all or a part of the procedures or functions are generated according to the embodiments of the present invention. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the descriptions of the embodiments have respective focuses. For a part that is not described in detail in an embodiment, refer to related descriptions in other embodiments.

The invention claimed is:

1. A speech synthesis method, wherein the method comprises:
    obtaining a text feature parameter of a target text;
    obtaining an emotion type of the target text;
    selecting, based on the emotion type, an acoustic model corresponding to the emotion type, wherein the acoustic model is obtained through training by using a text feature parameter and an emotion intensity feature vector of a training sample corresponding to the emotion type as an input and by using an acoustic feature vector of the training sample as an output; wherein
    the emotion intensity feature vector is obtained by reducing dimensions of an acoustic statistical feature vector of the training sample;
    receiving an emotion intensity value input by a user, to determine a corresponding emotion intensity feature vector, wherein the emotion intensity value input by the user is continuously adjustable; or analyzing a target text to determine an emotion intensity feature vector;
    inputting the text feature parameter and the emotion intensity feature vector into the acoustic model to obtain a target acoustic feature vector; and
    synthesizing, based on the target acoustic feature vector, a speech of an emotion intensity corresponding to the target text; wherein
    the acoustic model is a machine learning model.

2. The method according to claim 1, wherein the obtaining an emotion type of the target text comprises:
    receiving an emotion type corresponding to the target text input by the user, or analyzing the target text to determine an emotion type corresponding to the target text.

3. The method according to claim 1, wherein the receiving an emotion intensity value input by a user, to determine a corresponding emotion intensity feature vector comprises:
    receiving selection of an emotion intensity area performed by the user by using an interaction interface; and
    determining the corresponding emotion intensity feature vector based on the selection of the emotion intensity area.

4. The method according to claim 1, wherein that the emotion intensity feature vector is obtained by reducing dimensions of an acoustic statistical feature vector of the training sample comprises:
    obtaining an acoustic statistical feature vector related to an emotion intensity of the training sample; wherein the acoustic statistical feature vector related to the emotion intensity comprises n of the following: an energy average value, an energy maximum value, an energy change amplitude, a speech rate average value, a logarithmic fundamental frequency average value, a logarithmic fundamental frequency maximum value, and a logarithmic fundamental frequency change amplitude, wherein n is greater than 2; and there are N training samples, wherein N>1; and converting the acoustic statistical feature vector that is related to the emotion intensity and that is each of the N training samples into an m-dimensional emotion intensity feature vector, wherein m is less than n, and both m and n are natural numbers.

5. The method according to claim 1, wherein the emotion intensity feature vector is a 3-dimensional vector.

6. An emotion speech acoustic feature obtaining device, wherein the emotion speech acoustic feature obtaining device comprises:

at least one processor and a memory coupled to the at least one processor, wherein the memory comprises an instruction that may be run by the at least one processor to perform functions; and the functions comprise:

obtaining a text feature parameter of a target text;

obtaining an emotion type of the target text;

selecting, based on the emotion type, an acoustic model corresponding to the emotion type; wherein the acoustic model is obtained through training by using a text feature parameter and an emotion intensity feature vector of a training sample corresponding to the emotion type as an input and by using an acoustic feature vector of the training sample as an output; and the emotion intensity feature vector is obtained by reducing dimensions of an acoustic statistical feature vector of the training sample;

receiving an emotion intensity value input by a user, to determine a corresponding emotion intensity feature vector, wherein the emotion intensity value input by the user is continuously adjustable; or analyzing a target text to determine an emotion intensity feature vector; and inputting the text feature parameter and the emotion intensity feature vector into the acoustic model to obtain a target acoustic feature vector; wherein the acoustic model is a machine learning model.

7. The device according to claim 6, wherein the obtaining an emotion type of the target text comprises that the processor receives, by using an interaction interface, an emotion type corresponding to the target text input by the user.

8. The device according to claim 6, wherein the obtaining an emotion type of the target text comprises that the processor analyses the target text to determine an emotion type corresponding to the target text.

9. The device according to claim 6, wherein that the processor receives, by using a interaction interface, an emotion intensity value input by a user, to determine a corresponding emotion intensity feature vector comprises:

receiving selection of an emotion intensity area performed by the user by using the interaction interface; and determining the corresponding emotion intensity feature vector based on the selection of the emotion intensity area.

10. The device according to claim 6, wherein the emotion speech acoustic feature obtaining device further comprises:

a vocoder, configured to synthesize a speech of an emotion intensity of the target text based on the target acoustic feature vector obtained by the processor.

11. An emotion speech acoustic feature obtaining device, wherein the emotion speech acoustic feature obtaining device comprises:

at least one processor and a memory coupled to the at least one processor, wherein the memory comprises an instruction that may be run by the at least one processor to perform functions; and the functions comprise:

obtaining a text feature parameter of a target text;

obtaining an emotion type of the target text;

receiving an emotion intensity value input by a user, to determine a corresponding emotion intensity feature vector, wherein the emotion intensity value input by the user is continuously adjustable; or analyzing a target text to determine an emotion intensity feature vector; and inputting the text feature parameter, the emotion type, and the emotion intensity feature vector of the target text into an acoustic model to obtain a target acoustic feature vector; wherein the acoustic model is obtained through training by using an emotion type, a text feature parameter, and an emotion intensity feature vector of a training sample as an input and by using an acoustic feature vector of the training sample as an output; and the emotion intensity feature vector is obtained by reducing dimensions of an acoustic statistical feature vector of the training sample.

12. The device according to claim 11, wherein the obtaining an emotion type of the target text comprises that the processor receives, by using an interaction interface, an emotion type corresponding to the target text input by the user.

13. The device according to claim 11, wherein the obtaining an emotion type of the target text comprises that the processor analyses the target text to determine an emotion type corresponding to the target text.

14. The device according to claim 11, wherein that the processor receives, by using the interaction interface, an emotion intensity value input by a user, to determine a corresponding emotion intensity feature vector comprises:

receiving selection of an emotion intensity area performed by the user by using the interaction interface; and determining the corresponding emotion intensity feature vector based on the selection of the emotion intensity area.

15. The device according to claim 11, wherein the emotion speech acoustic feature obtaining device further comprises:

a vocoder, configured to synthesize a speech of an emotion intensity of the target text based on the target acoustic feature vector obtained by the processor.

* * * * *